US012720027B2

(12) United States Patent
Okuno et al.

(10) Patent No.: US 12,720,027 B2
(45) Date of Patent: Aug. 25, 2026

(54) INFORMATION PROCESSING METHOD AND INFORMATION PROCESSING SYSTEM

(71) Applicant: Panasonic Intellectual Property Corporation of America, Torrance, CA (US)

(72) Inventors: Tomoyuki Okuno, Osaka (JP); Yohei Nakata, Osaka (JP); Yasunori Ishii, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 483 days.

(21) Appl. No.: 18/081,887

(22) Filed: Dec. 15, 2022

(65) Prior Publication Data

US 2023/0344972 A1 Oct. 26, 2023

Related U.S. Application Data

(63) Continuation of application No. PCT/JP2021/019551, filed on May 24, 2021.

(Continued)

(30) Foreign Application Priority Data

Feb. 4, 2021 (JP) ................................ 2021-016364

(51) Int. Cl.
*H04N 9/31* (2006.01)
*G06T 5/60* (2024.01)

(52) U.S. Cl.
CPC ............. *H04N 9/3188* (2013.01); *G06T 5/60* (2024.01); *H04N 9/3185* (2013.01); *G06T 2207/20081* (2013.01)

(58) Field of Classification Search
None
See application file for complete search history.

(56) References Cited

U.S. PATENT DOCUMENTS

| | | | | |
|---|---|---|---|---|
| 2016/0328644 | A1 | 11/2016 | Lin et al. | |
| 2020/0050943 | A1* | 2/2020 | Ishii | G06N 3/08 |
| 2024/0020581 | A1* | 1/2024 | Idesawa | G06N 3/08 |

FOREIGN PATENT DOCUMENTS

| | | | | |
|---|---|---|---|---|
| CA | 3095109 | A1 * | 9/2019 | A61B 6/032 |
| CN | 109711443 | A * | 5/2019 | |

OTHER PUBLICATIONS

Extended European Search Report issued Dec. 4, 2023 in corresponding European Patent Application No. 21838675.3.

(Continued)

*Primary Examiner* — Jiangeng Sun
(74) *Attorney, Agent, or Firm* — Wenderoth, Lind & Ponack, L.L.P.

(57) ABSTRACT

Provided is an information processing method that includes: performing a conversion process on the first feature information to obtain a first conversion result; performing the conversion process on the second feature information to obtain a second conversion result; performing a projection process on the first conversion result to obtain a first projection result; performing the projection process on the second conversion result to obtain a second projection result; calculating an error between the first projection result and the second projection result; and training the second model to reduce the error. The conversion process produces an error between the first projection result and the second projection result that is greater than the error between a projection result obtained by performing the projection process on the first feature information and a projection result obtained by performing the projection process on the second feature information.

26 Claims, 26 Drawing Sheets

Related U.S. Application Data

(60) Provisional application No. 63/048,348, filed on Jul. 6, 2020.

(56) References Cited

OTHER PUBLICATIONS

Tung Fred et al: "Similarity-Preserving Knowledge Distillation", 2019 IEEE/CVF International Conference on Computer Vision (ICCV), IEEE, Oct. 27, 2019 (Oct. 27, 2019), pp. 1365-1374, XP033723736, DOI: 10.1109/ICCV.2019.00145.
Heo Byeongho et al: "A Comprehensive Overhaul of Feature Distillation", 2019 IEEE/CVF International Conference on Computer Vision (ICCV), IEEE, Oct. 27, 2019 (Oct. 27, 2019), pp. 1921-1930, XP033723550, DOI: 10.1109/ICCV.2019.00201.
International Search Report issued Jul. 27, 2021 in International (PCT) Application No. PCT/JP2021/019551.
Tzeng, Eric et al., "Deep Domain Confusion: Maximizing for Domain Invariance", Dec. 2014, arXiv:1412.3474v1.

* cited by examiner

Figure 1:
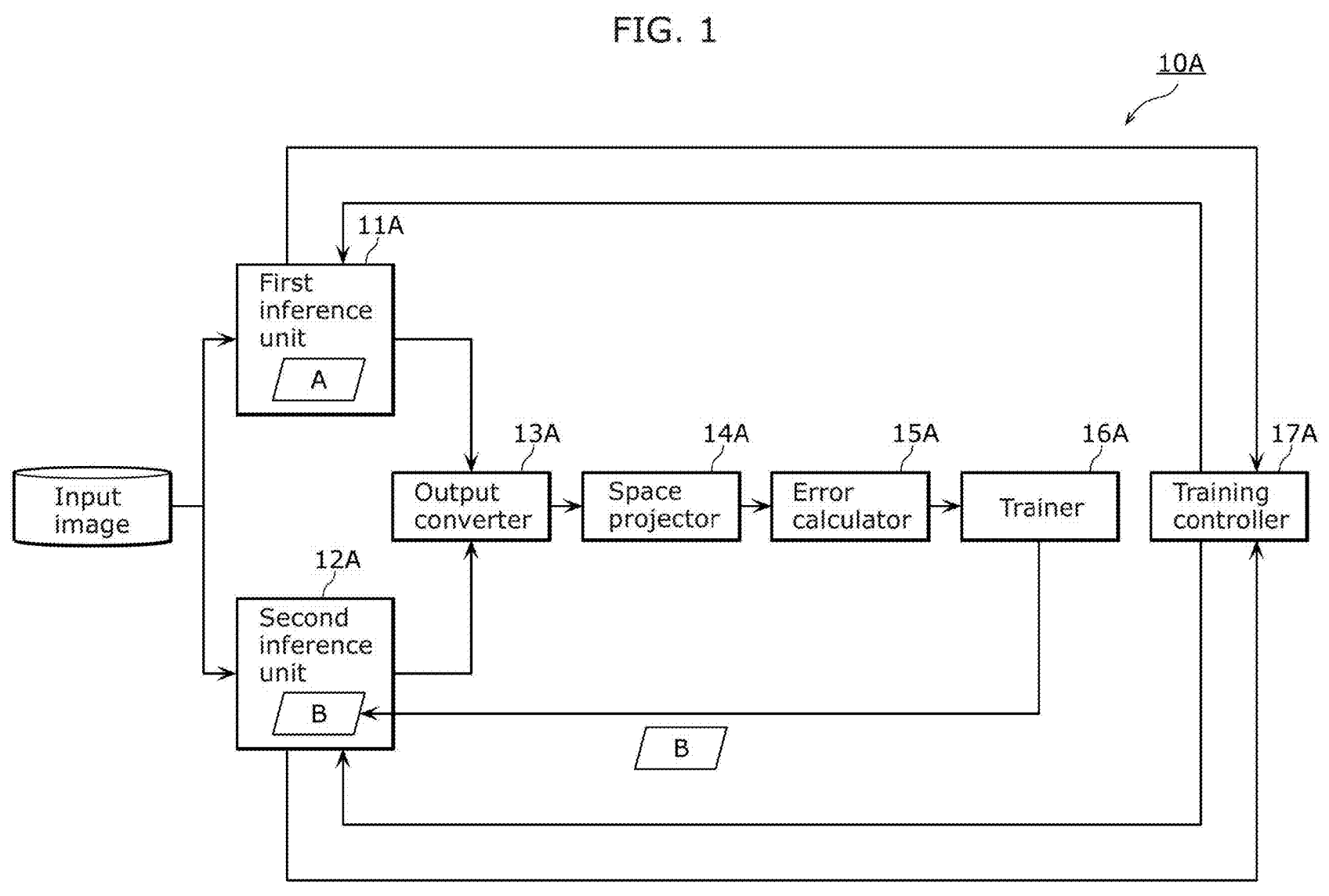

Input image

11A
First inference unit
A

12A
Second inference unit
B

13A
Output converter

14A
Space projector

15A
Error calculator

16A
Trainer

17A
Training controller

B

First inference unit 11A
Output converter 13A
Space projector 14A
Error calculator 15A
Trainer 16A
Input data
A
B
Feature information
Conversion result
Conversion process
Projection result
Space projection process
Update network B
B
Second inference unit 12A

Input image

21A
Obtainer

22A
Second inference unit
B

Inference result

10B
Input image
First inference unit
A
11A
Second inference unit
B
12B
Output converter
13A
Space projector
14A
Error calculator
15A
Trainer
16B
Training controller
17A
Converter
18B
B
B1

Figure 9:
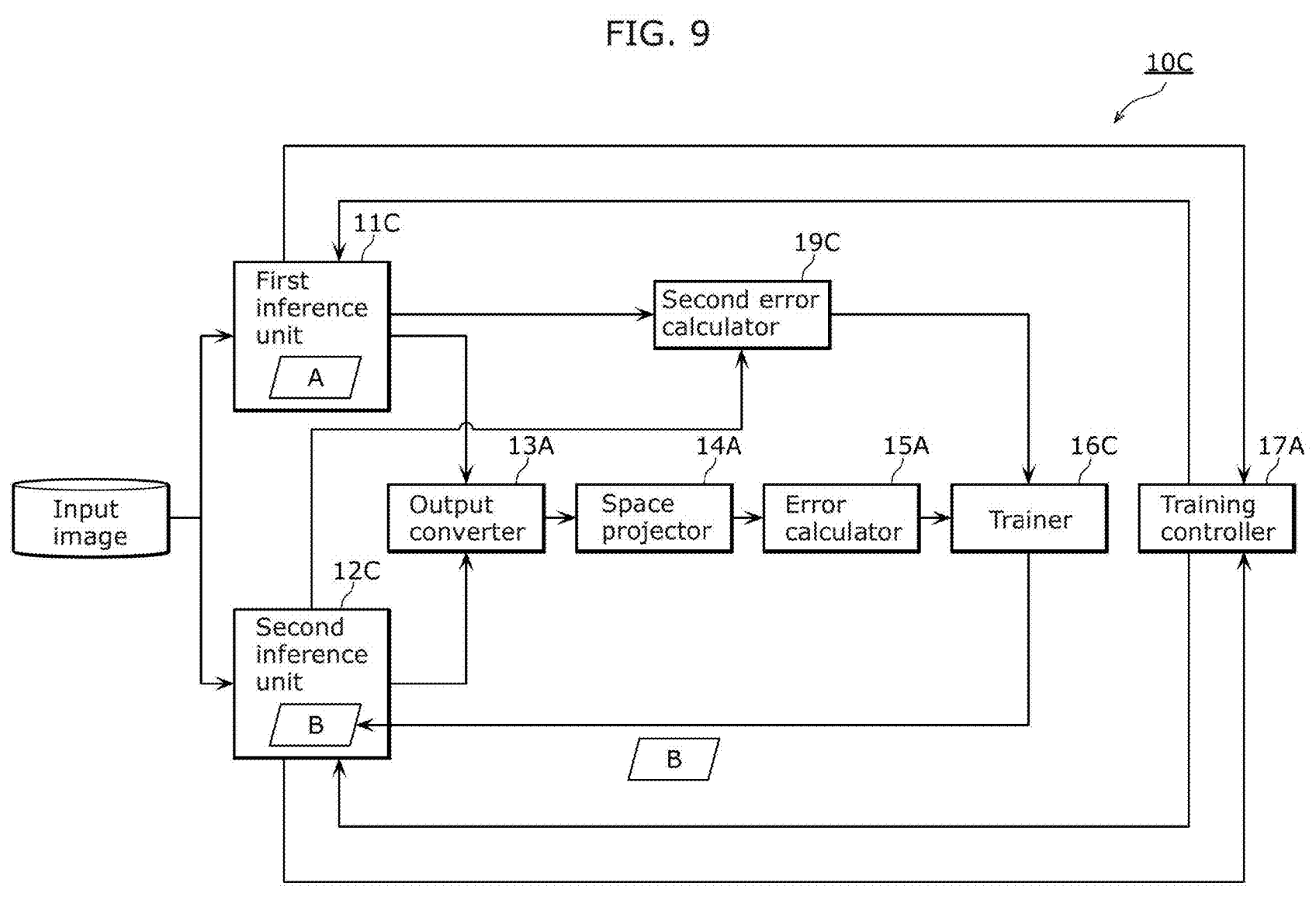

Input image

11C First inference unit A

12C Second inference unit B

13A Output converter

14A Space projector

15A Error calculator

16C Trainer

17A Training controller

19C Second error calculator

B

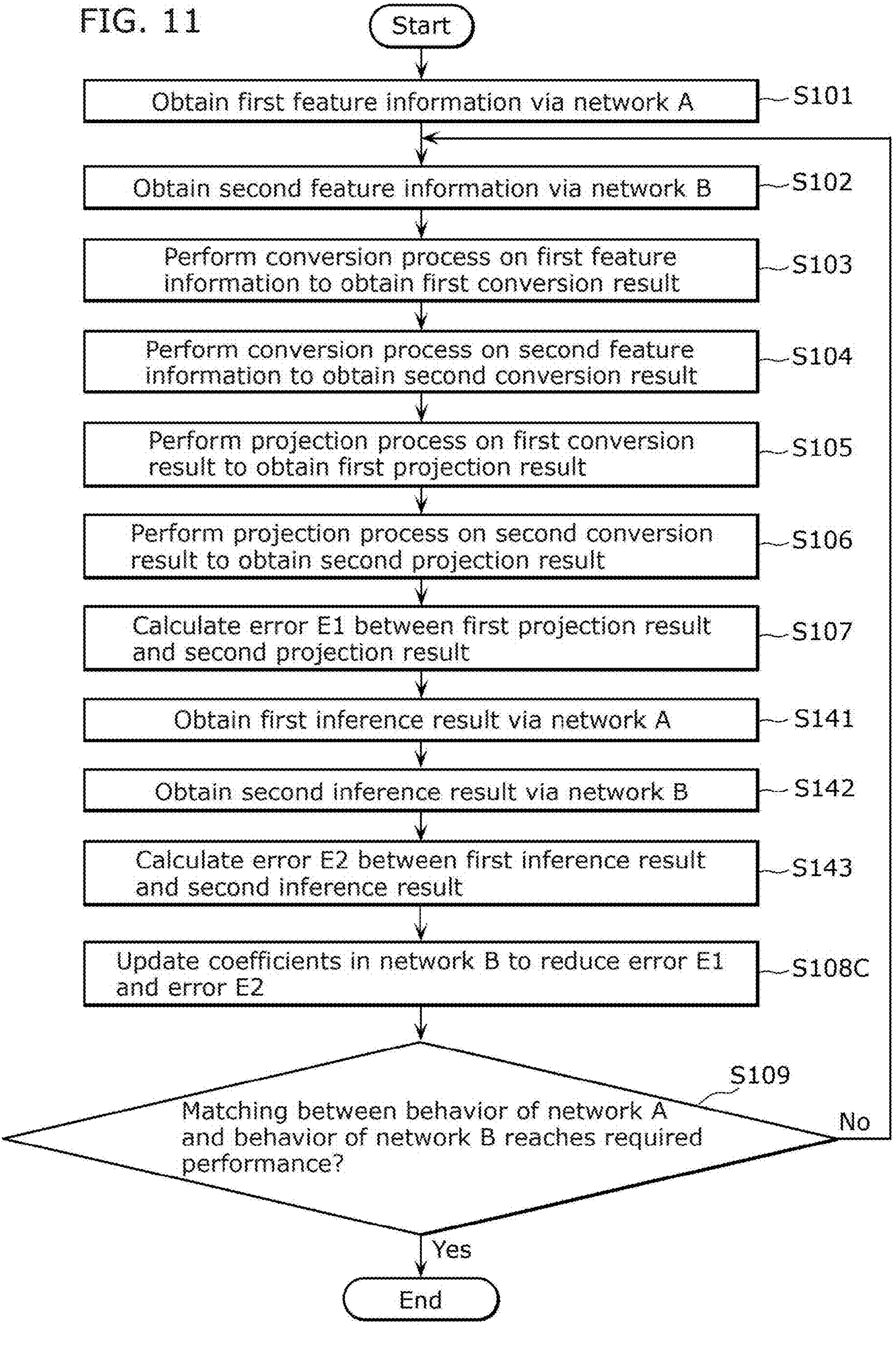
FIG. 11
Start
Obtain first feature information via network A
S101
Obtain second feature information via network B
S102
Perform conversion process on first feature information to obtain first conversion result
S103
Perform conversion process on second feature information to obtain second conversion result
S104
Perform projection process on first conversion result to obtain first projection result
S105
Perform projection process on second conversion result to obtain second projection result
S106
Calculate error E1 between first projection result and second projection result
S107
Obtain first inference result via network A
S141
Obtain second inference result via network B
S142
Calculate error E2 between first inference result and second inference result
S143
Update coefficients in network B to reduce error E1 and error E2
S108C
Matching between behavior of network A and behavior of network B reaches required performance?
S109
No
Yes
End

Figure 12:
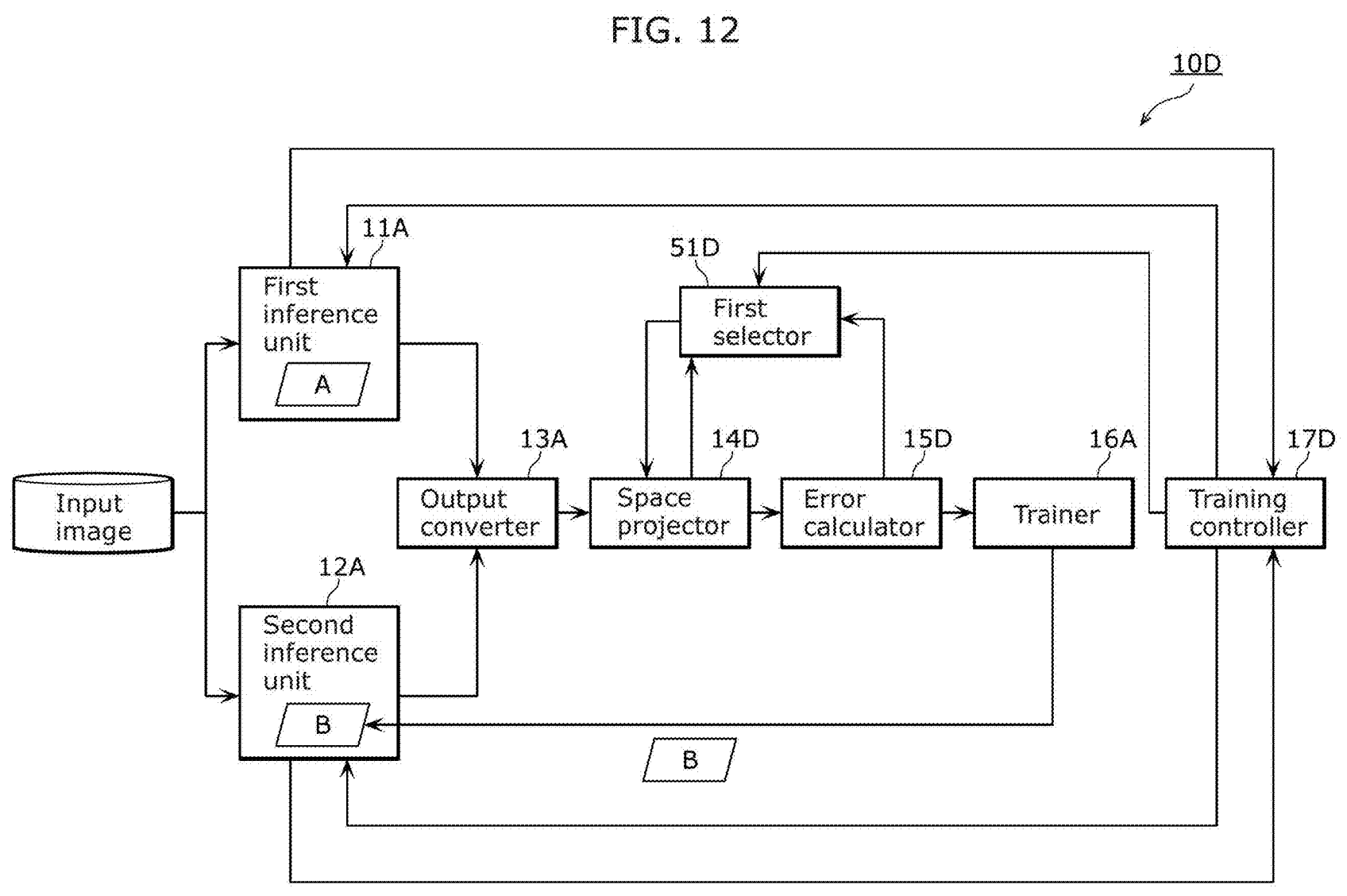

Training controller 17D

Trainer 16A

Error calculator 15D

First selector 51D

Space projector 14D

Output converter 13A

B

First inference unit A 11A

Second inference unit B 12A

Input image

FIG. 13

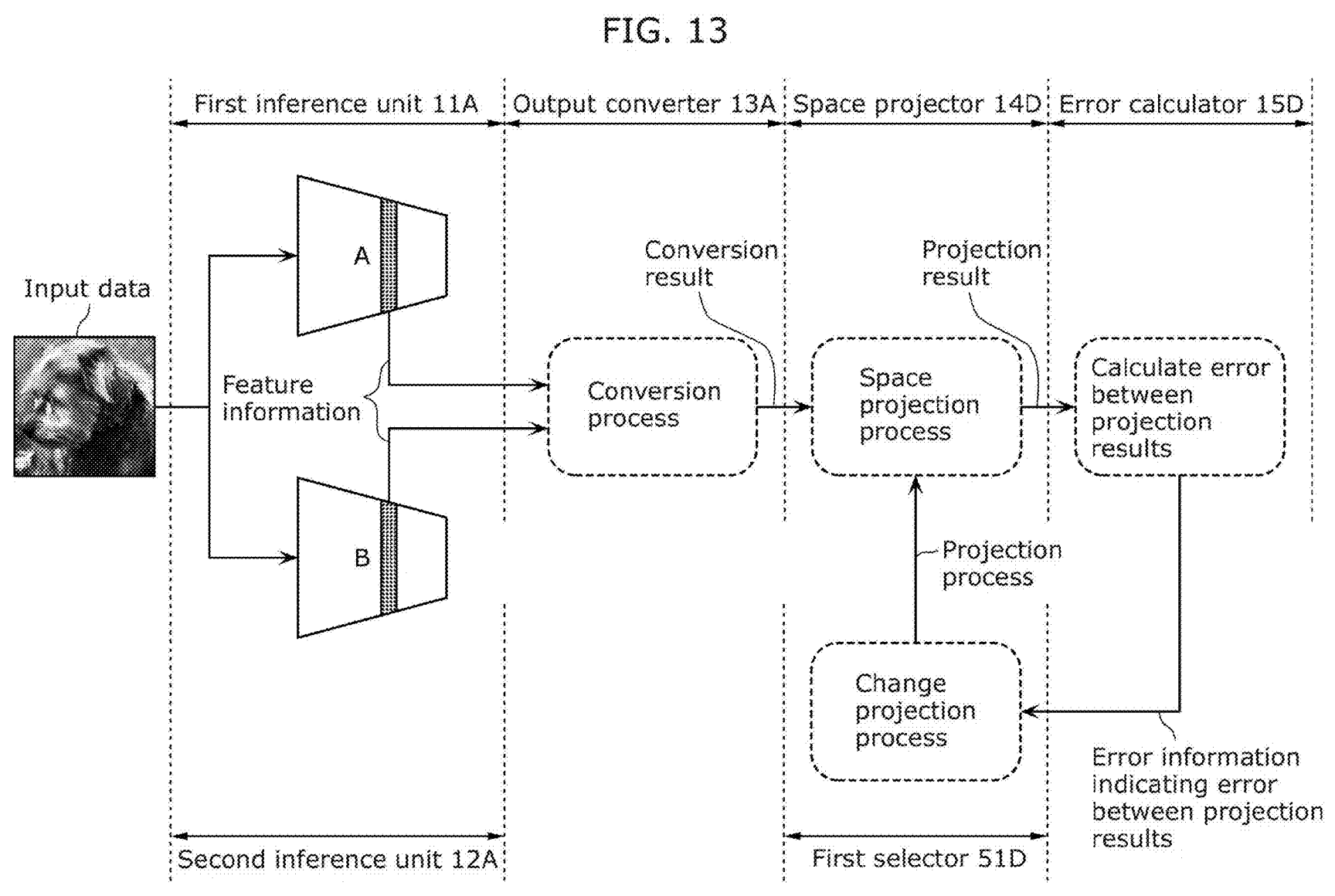

First inference unit 11A
Output converter 13A
Space projector 14D
Error calculator 15D
Input data
A
B
Feature information
Conversion result
Conversion process
Projection result
Space projection process
Calculate error between projection results
Projection process
Change projection process
Error information indicating error between projection results
Second inference unit 12A
First selector 51D First inference unit 11A
Output converter 13A
Space projector 14D
Error calculator 15D
Trainer 16A
Input data
A
B
Feature information
Conversion result
Conversion process
Projection result
Space projection process
Update network B
B
Second inference unit 12A

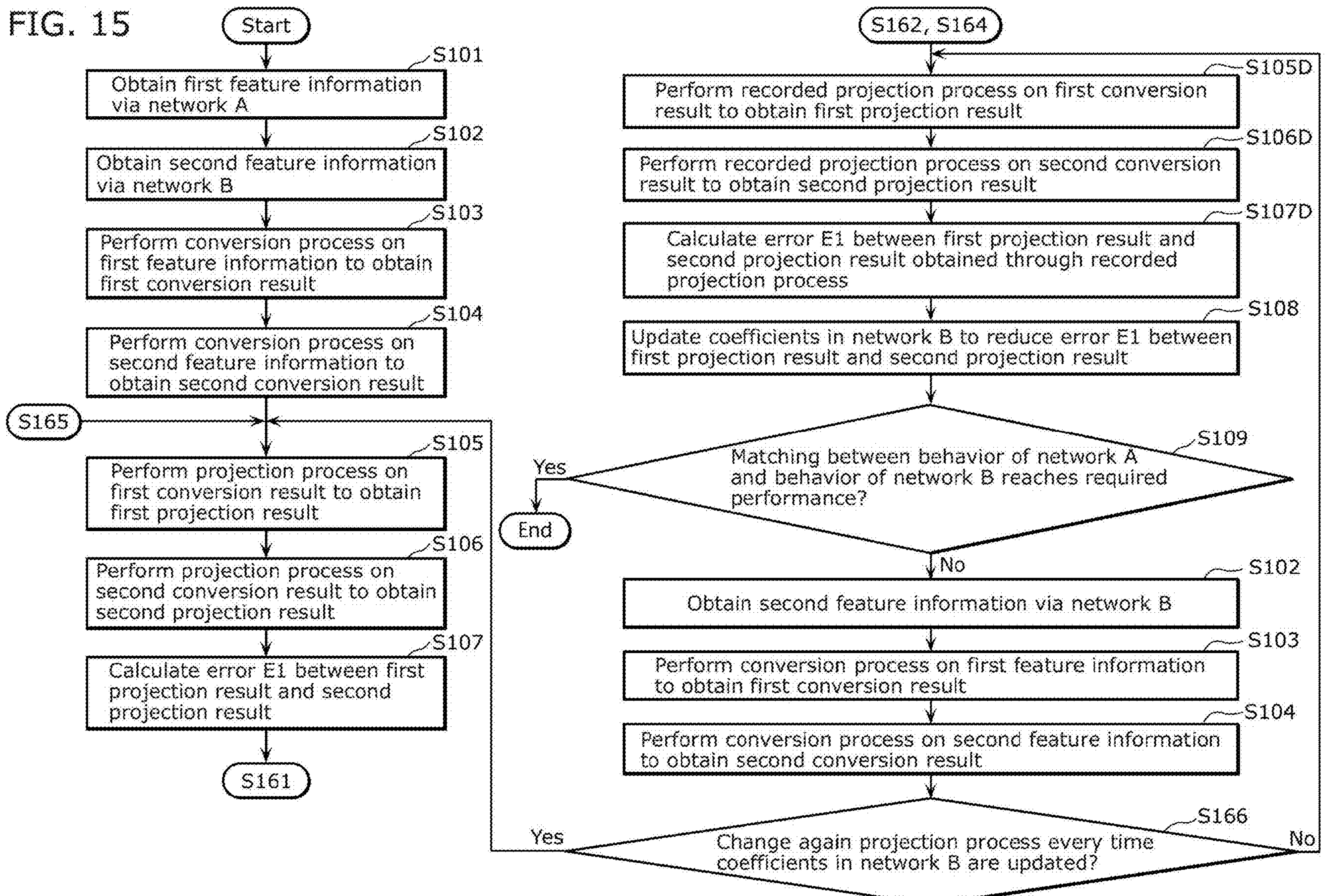
FIG. 15
Start
S101
Obtain first feature information via network A
S102
Obtain second feature information via network B
S103
Perform conversion process on first feature information to obtain first conversion result
S104
Perform conversion process on second feature information to obtain second conversion result
S165
S105
Perform projection process on first conversion result to obtain first projection result
S106
Perform projection process on second conversion result to obtain second projection result
S107
Calculate error E1 between first projection result and second projection result
S161
S162, S164
S105D
Perform recorded projection process on first conversion result to obtain first projection result
S106D
Perform recorded projection process on second conversion result to obtain second projection result
S107D
Calculate error E1 between first projection result and second projection result obtained through recorded projection process
S108
Update coefficients in network B to reduce error E1 between first projection result and second projection result
S109
Matching between behavior of network A and behavior of network B reaches required performance?
Yes
End
No
S102
Obtain second feature information via network B
S103
Perform conversion process on first feature information to obtain first conversion result
S104
Perform conversion process on second feature information to obtain second conversion result
S166
Change again projection process every time coefficients in network B are updated?
Yes
No

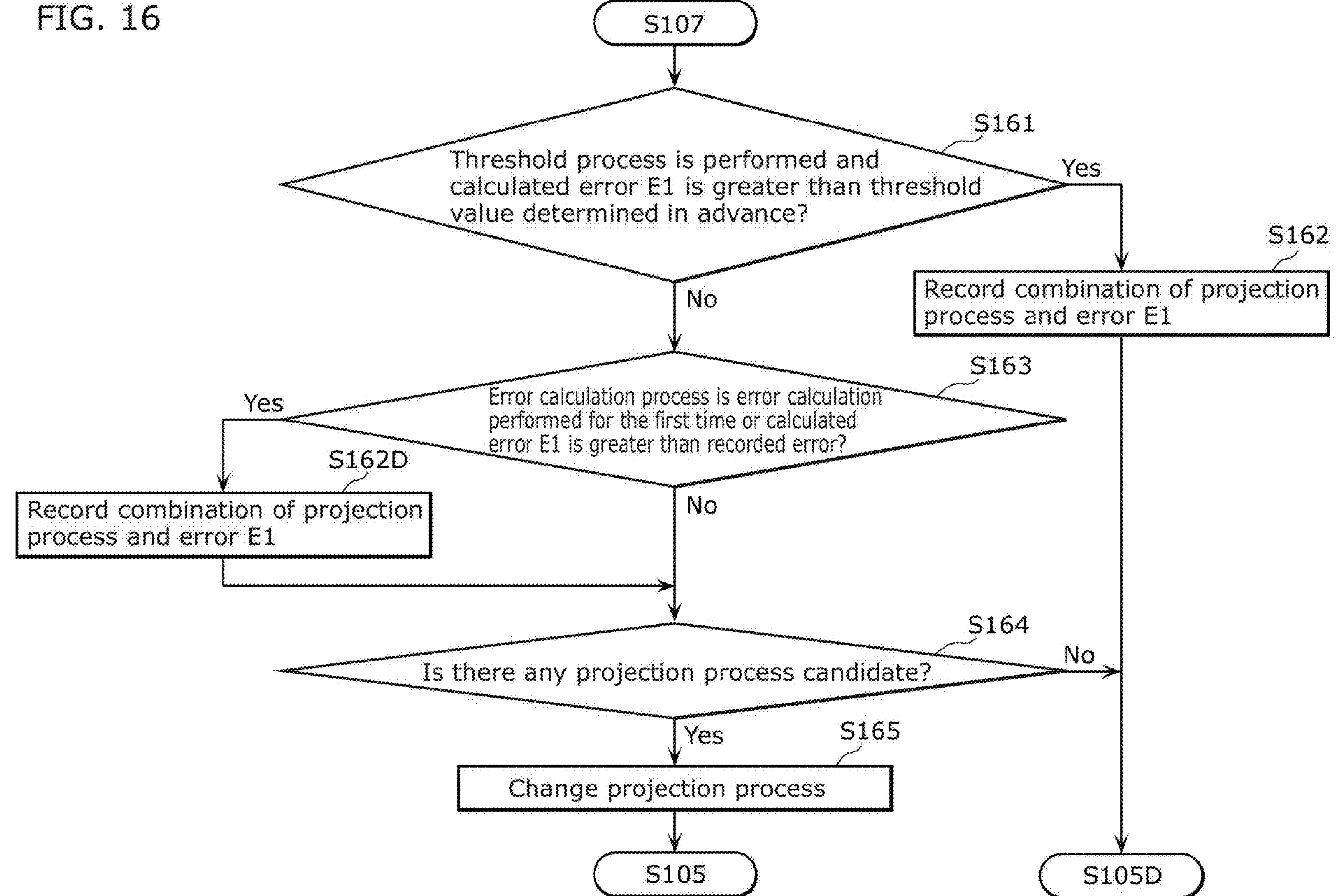
FIG. 16
S107
S161
Threshold process is performed and calculated error E1 is greater than threshold value determined in advance?
Yes
No
S162
Record combination of projection process and error E1
S163
Error calculation process is error calculation performed for the first time or calculated error E1 is greater than recorded error?
Yes
No
S162D
Record combination of projection process and error E1
S164
Is there any projection process candidate?
No
Yes
S165
Change projection process
S105
S105D

Figure 17:
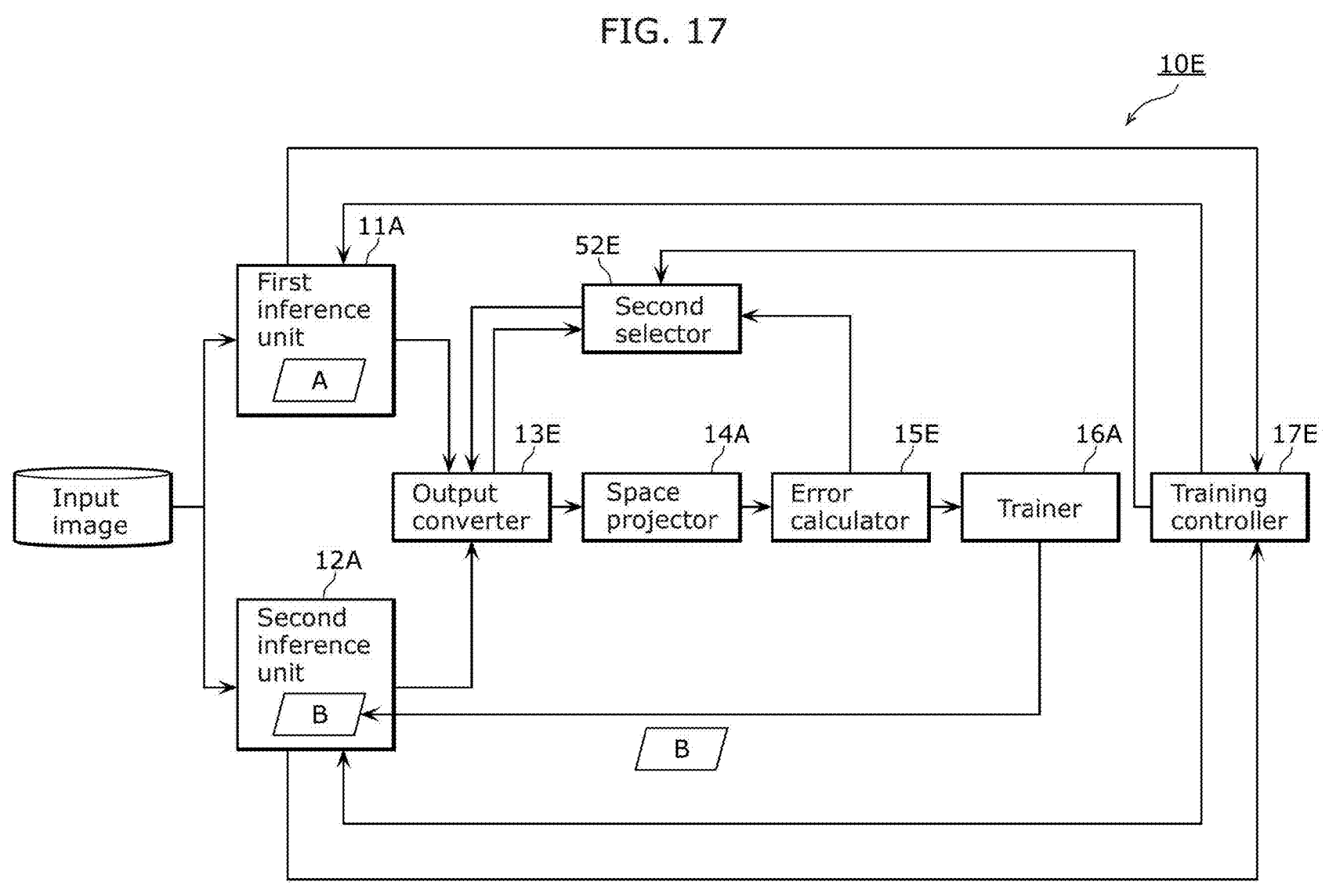

17E Training controller

16A Trainer

15E Error calculator

14A Space projector

13E Output converter

52E Second selector

11A First inference unit A

12A Second inference unit B

B

Input image

FIG. 18

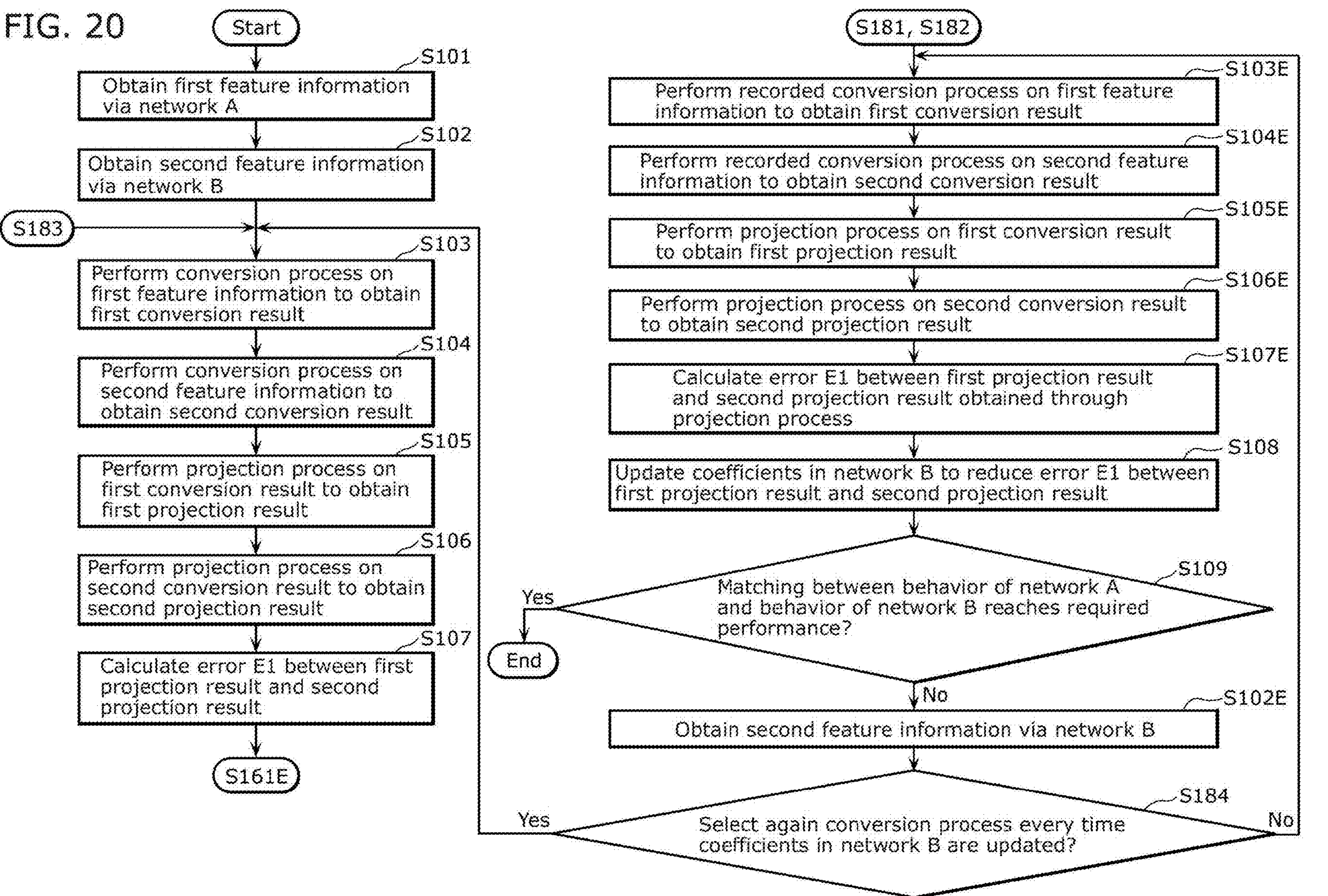
FIG. 20
Start
S101
Obtain first feature information via network A
S102
Obtain second feature information via network B
S183
S103
Perform conversion process on first feature information to obtain first conversion result
S104
Perform conversion process on second feature information to obtain second conversion result
S105
Perform projection process on first conversion result to obtain first projection result
S106
Perform projection process on second conversion result to obtain second projection result
S107
Calculate error E1 between first projection result and second projection result
S161E
S181, S182
S103E
Perform recorded conversion process on first feature information to obtain first conversion result
S104E
Perform recorded conversion process on second feature information to obtain second conversion result
S105E
Perform projection process on first conversion result to obtain first projection result
S106E
Perform projection process on second conversion result to obtain second projection result
S107E
Calculate error E1 between first projection result and second projection result obtained through projection process
S108
Update coefficients in network B to reduce error E1 between first projection result and second projection result
S109
Matching between behavior of network A and behavior of network B reaches required performance?
Yes
End
No
S102E
Obtain second feature information via network B
S184
Select again conversion process every time coefficients in network B are updated?
Yes
No

Figure 22:
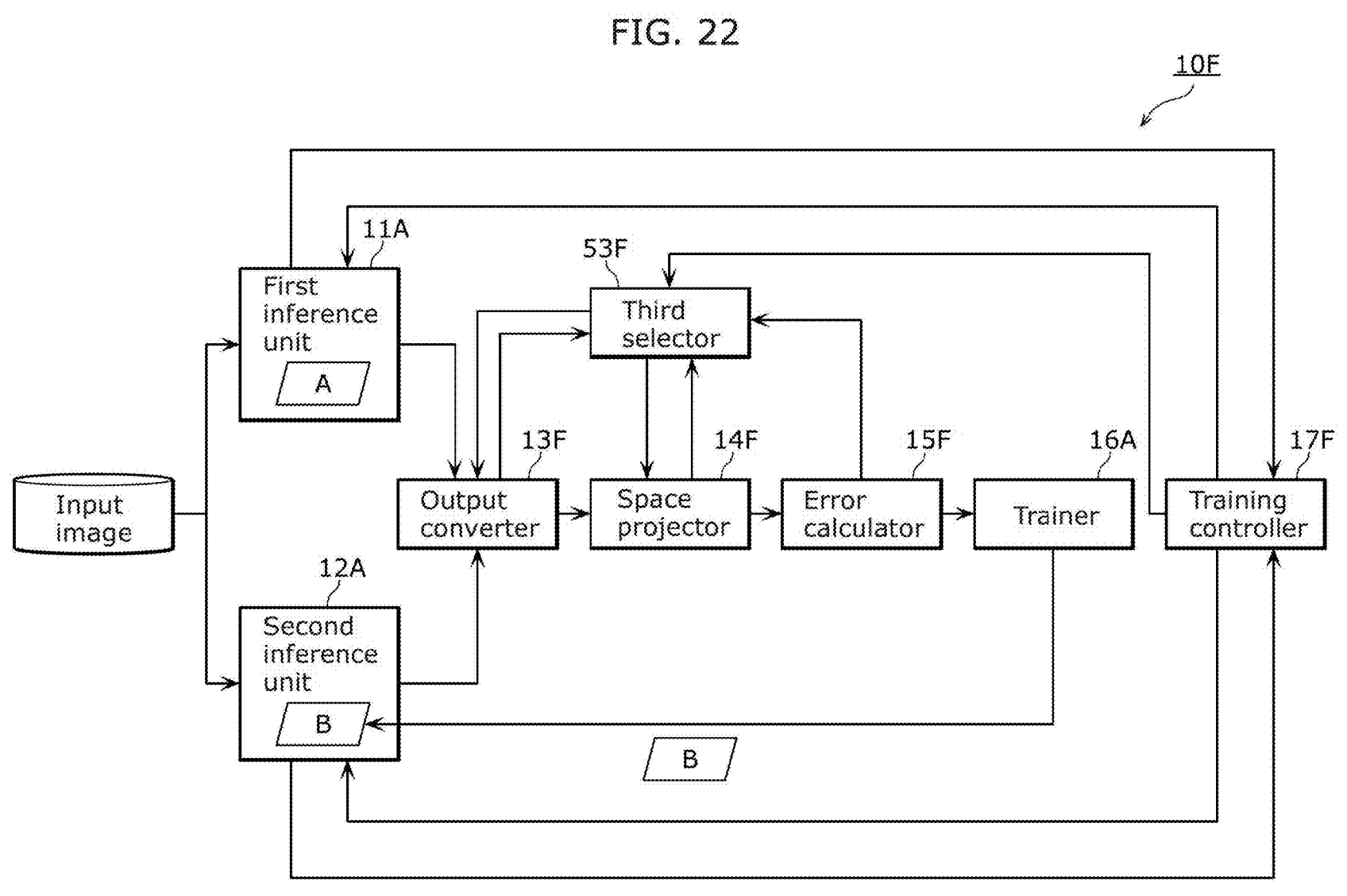

Input image

First inference unit
A
11A

Second inference unit
B
12A

Output converter
13F

Third selector
53F

Space projector
14F

Error calculator
15F

Trainer
16A

Training controller
17F

Figure 23:
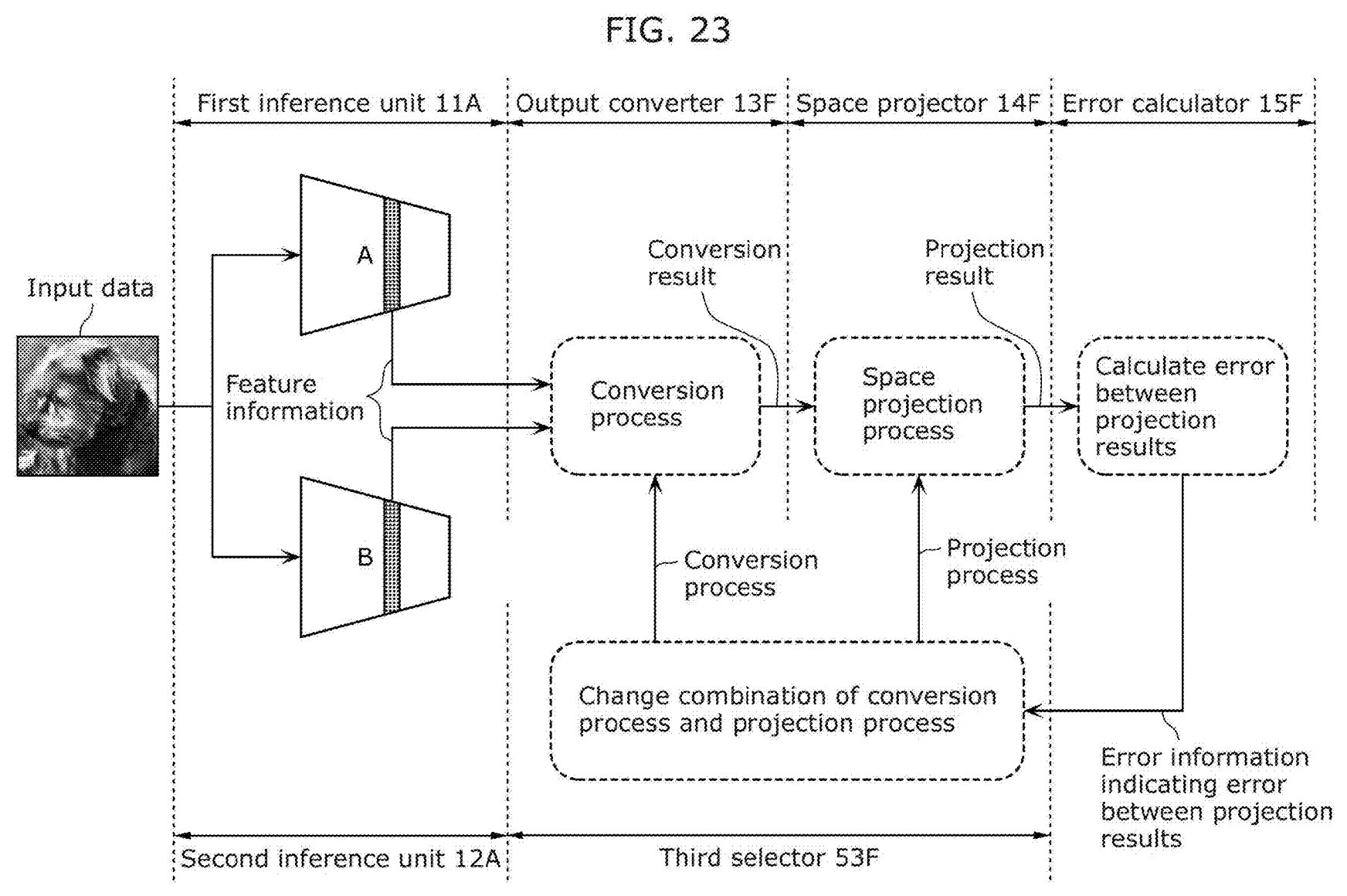

First inference unit 11A
Output converter 13F
Space projector 14F
Error calculator 15F
Second inference unit 12A
Third selector 53F
Input data
A
B
Feature information
Conversion process
Conversion result
Space projection process
Projection result
Calculate error between projection results
Error information indicating error between projection results
Change combination of conversion process and projection process
Conversion process
Projection process

FIG. 24

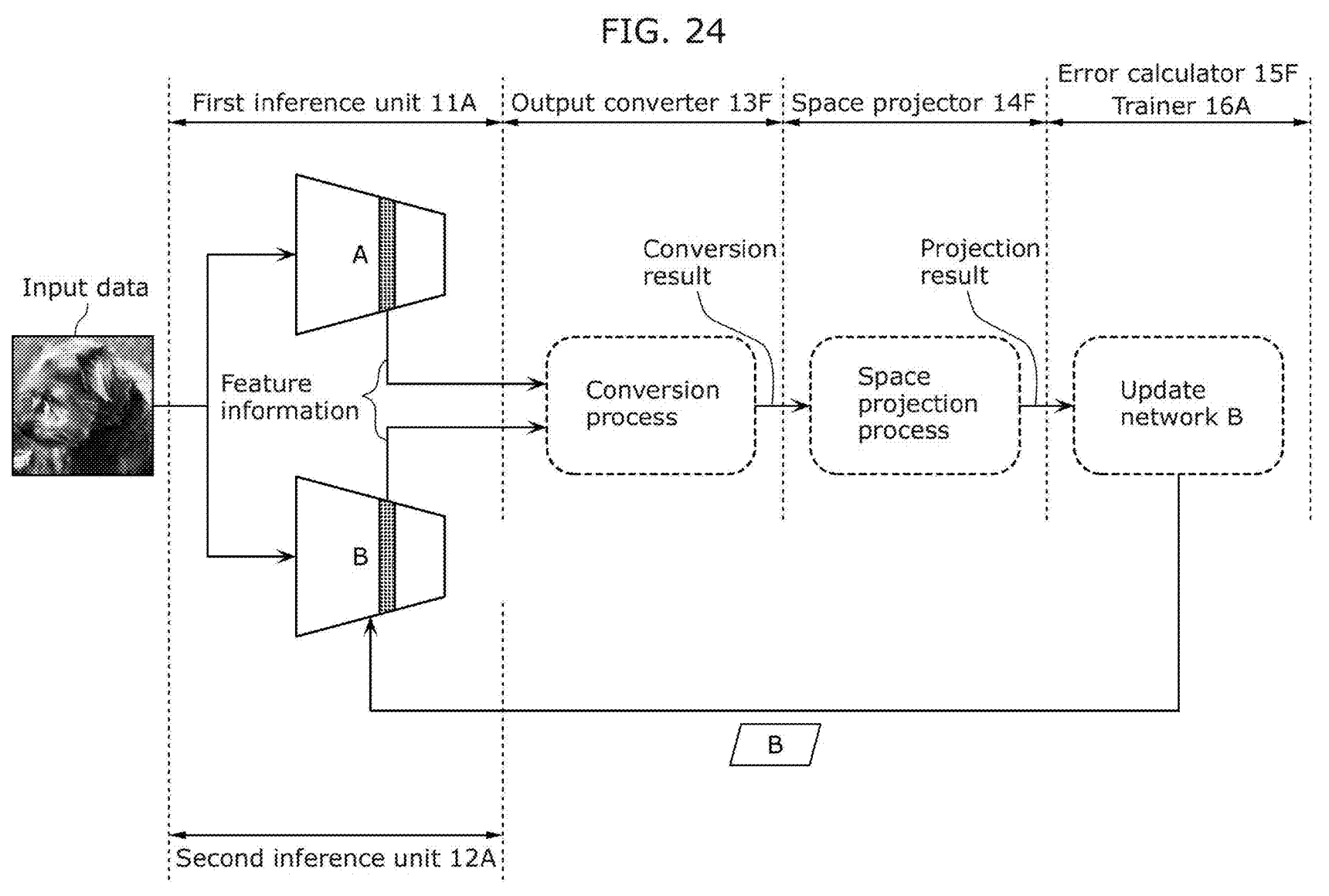

Input data

First inference unit 11A

Second inference unit 12A

Output converter 13F

Space projector 14F

Error calculator 15F
Trainer 16A

A

B

Feature information

Conversion process

Conversion result

Space projection process

Projection result

Update network B

B

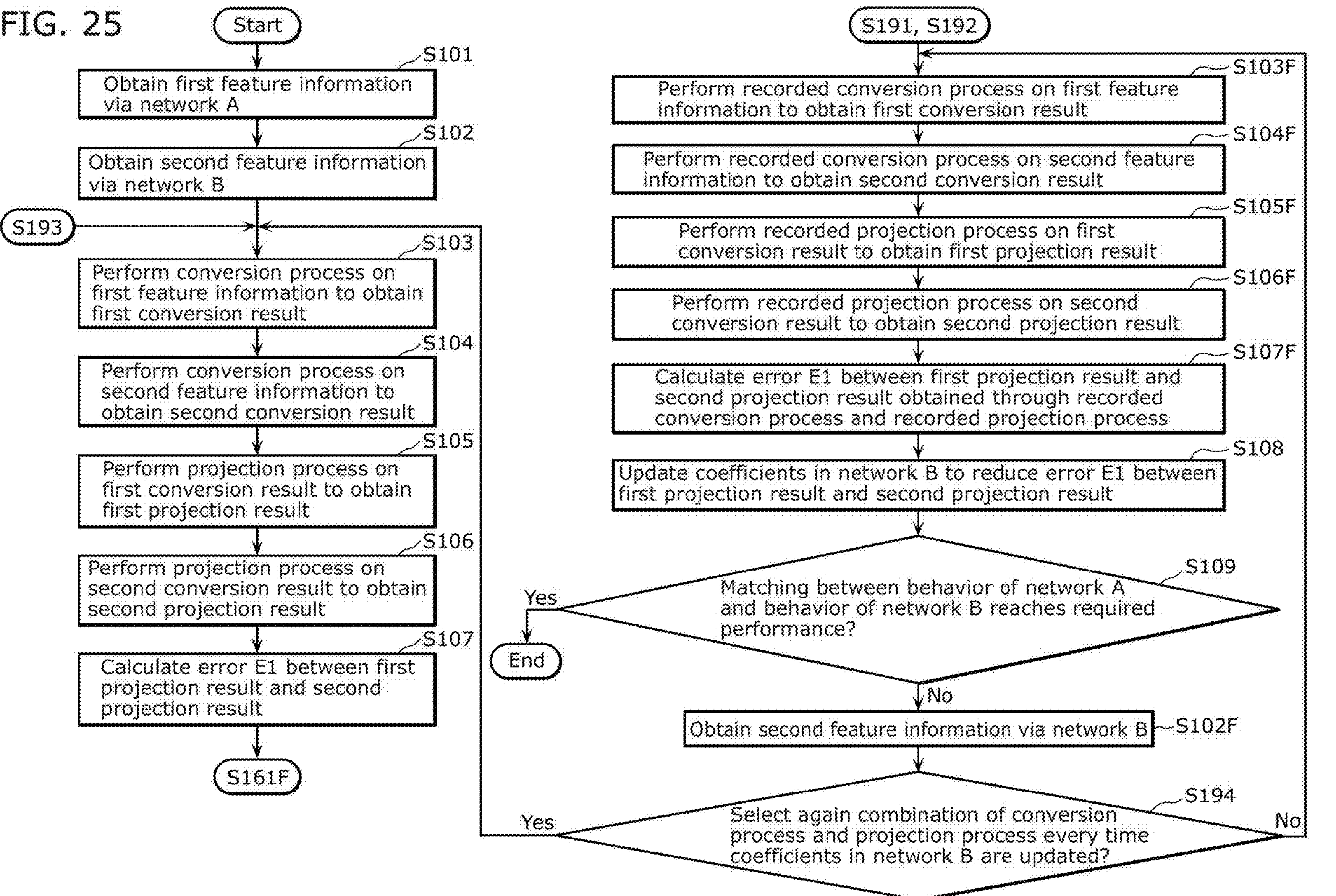
FIG. 25
Start
Obtain first feature information via network A
S101
Obtain second feature information via network B
S102
S193
Perform conversion process on first feature information to obtain first conversion result
S103
Perform conversion process on second feature information to obtain second conversion result
S104
Perform projection process on first conversion result to obtain first projection result
S105
Perform projection process on second conversion result to obtain second projection result
S106
Calculate error E1 between first projection result and second projection result
S107
S161F
S191, S192
Perform recorded conversion process on first feature information to obtain first conversion result
S103F
Perform recorded conversion process on second feature information to obtain second conversion result
S104F
Perform recorded projection process on first conversion result to obtain first projection result
S105F
Perform recorded projection process on second conversion result to obtain second projection result
S106F
Calculate error E1 between first projection result and second projection result obtained through recorded conversion process and recorded projection process
S107F
Update coefficients in network B to reduce error E1 between first projection result and second projection result
S108
Matching between behavior of network A and behavior of network B reaches required performance?
S109
Yes
End
No
Obtain second feature information via network B
S102F
Select again combination of conversion process and projection process every time coefficients in network B are updated?
S194
Yes
No

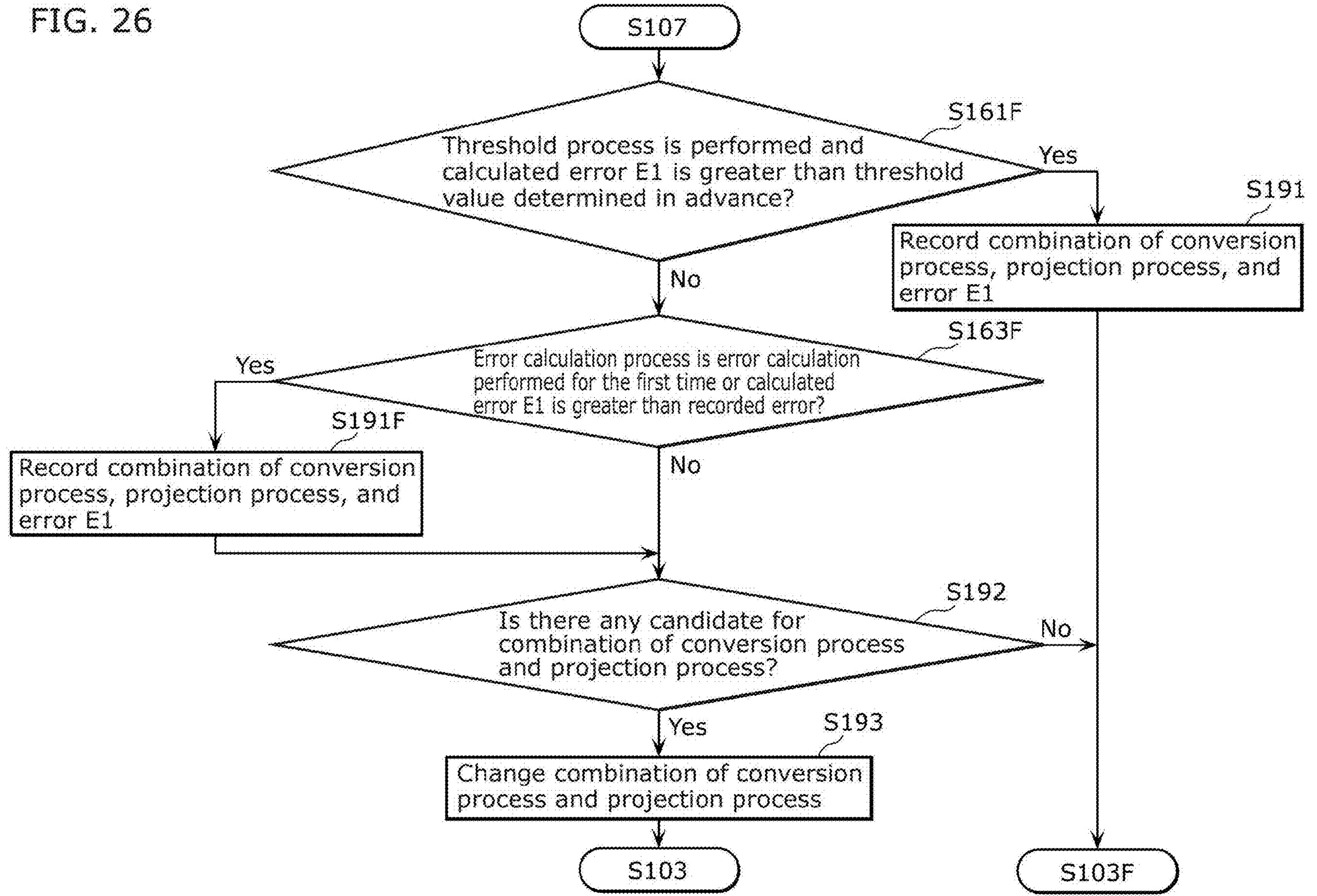
FIG. 26
S107
S161F
Threshold process is performed and calculated error E1 is greater than threshold value determined in advance?
Yes
No
S191
Record combination of conversion process, projection process, and error E1
S163F
Error calculation process is error calculation performed for the first time or calculated error E1 is greater than recorded error?
Yes
No
S191F
Record combination of conversion process, projection process, and error E1
S192
Is there any candidate for combination of conversion process and projection process?
No
Yes
S193
Change combination of conversion process and projection process
S103
S103F

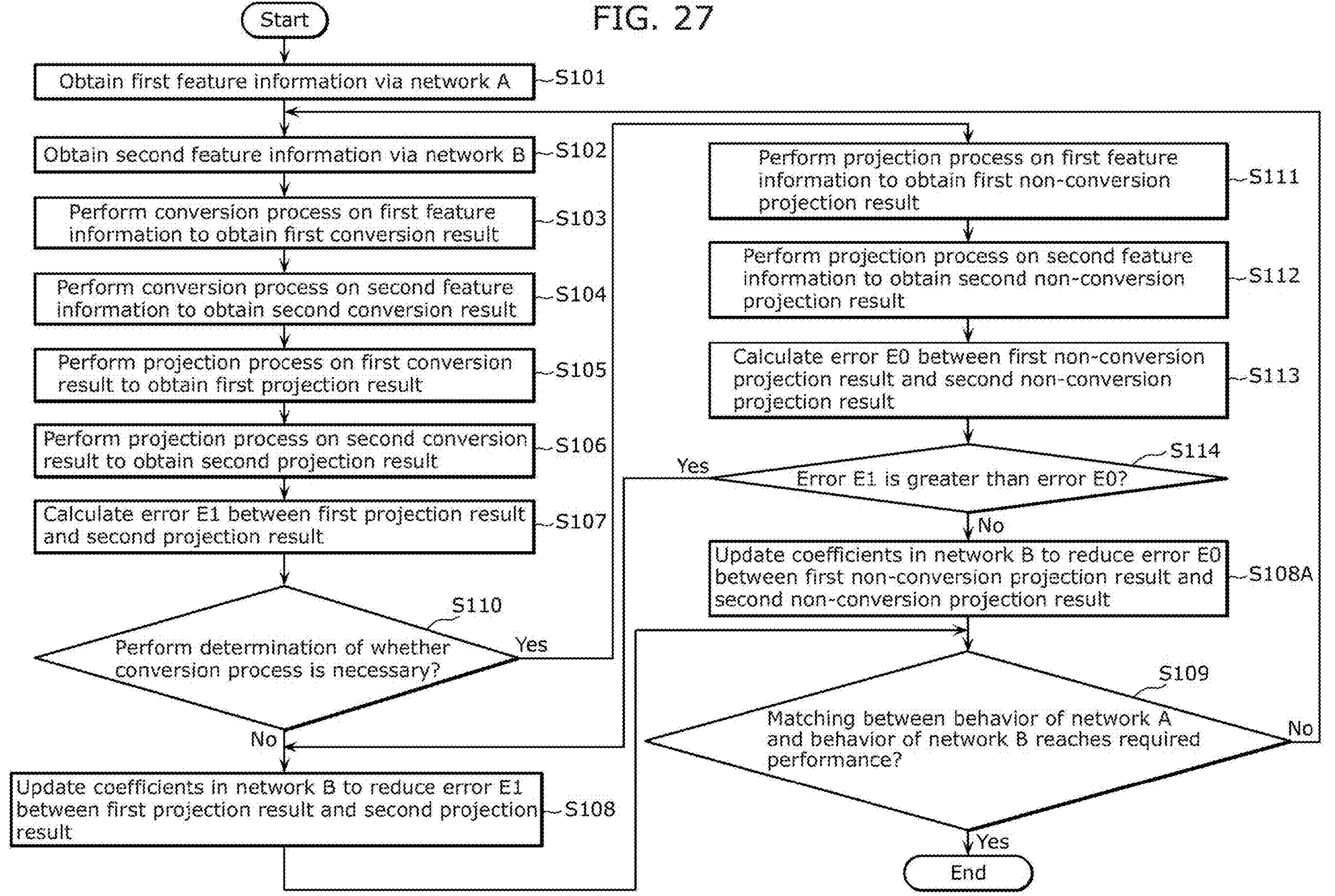
FIG. 27
Start
Obtain first feature information via network A
S101
Obtain second feature information via network B
S102
Perform conversion process on first feature information to obtain first conversion result
S103
Perform conversion process on second feature information to obtain second conversion result
S104
Perform projection process on first conversion result to obtain first projection result
S105
Perform projection process on second conversion result to obtain second projection result
S106
Calculate error E1 between first projection result and second projection result
S107
Perform determination of whether conversion process is necessary?
S110
Yes
No
Update coefficients in network B to reduce error E1 between first projection result and second projection result
S108
Perform projection process on first feature information to obtain first non-conversion projection result
S111
Perform projection process on second feature information to obtain second non-conversion projection result
S112
Calculate error E0 between first non-conversion projection result and second non-conversion projection result
S113
Error E1 is greater than error E0?
S114
Yes
No
Update coefficients in network B to reduce error E0 between first non-conversion projection result and second non-conversion projection result
S108A
Matching between behavior of network A and behavior of network B reaches required performance?
S109
No
Yes
End

INFORMATION PROCESSING METHOD AND INFORMATION PROCESSING SYSTEM

CROSS REFERENCE TO RELATED APPLICATIONS

This is a continuation application of PCT International Application No. PCT/JP2021/019551 filed on May 24, 2021, designating the United States of America, which is based on and claims priority of Japanese Patent Application No. 2021-016364 filed on Feb. 4, 2021 and U.S. Provisional Patent Application No. 63/048,348 filed on Jul. 6, 2020. The entire disclosures of the above-identified applications, including the specifications, drawings and claims are incorporated herein by reference in their entirety.

FIELD

The present disclosure relates to information processing methods and information processing systems.

BACKGROUND

There has been a technique of changing a configuration for a machine learning process based on the computing resources and performance specifications of a system (see Patent Literature (PTL) 1, for example). Owing to this technique, inference performance is maintained to some extent even with limited computing resources and performance specifications.

In addition, there has been a technique of reducing, based on the distance between input data in a projection space, a difference in inference performance generated between two inference models whose input data are different (see Non Patent Literature (NPL) 1, for example). Owing to this technique, it is possible to reduce such an inference performance difference to some extent even though input data are different between two inference models.

As used herein, inference performance is accuracy or the degree of precision of an inference result relative to correct answer data and is, for example, the correct answer rate of an inference result relative to the entire input data.

CITATION LIST

Patent Literature

PTL 1: US Patent Application Publication No. 2016/0328644, the Specification

Non Patent Literature

NPL 1: Eric Tzeng, Judy Hoffman, Ning Zhang, Kate Saenko, and Trevor Darrell, "Deep domain confusion: Maximizing for domain invariance", arXiv: 1412.3474

SUMMARY

Technical Problem

Unfortunately, a problem is that with the technique disclosed in the aforementioned PTL 1, although inference performance is maintained, an inference result obtained using an inference model obtained through a machine learning process for which a configuration has not been changed may be different from an inference result obtained using an inference model obtained through a machine learning process for which a configuration has been changed.

Another problem is that with the technique disclosed in the aforementioned NPL 1, the distance between input data in a projection space decreases depending on the combination of the input data, and training using a machine learning process may not proceed any further.

The present disclosure is to solve the conventional problems described above and provides an information processing method and the like of reducing an inference result difference to be generated between two inference models, irrespective of the combination of input data.

Solution to Problem

An information processing method according to one aspect of the present disclosure is an information processing method that is executed by a processor and includes: inputting first data to a first inference model to obtain first feature information; inputting the first data to a second inference model to obtain second feature information; performing a conversion process on the first feature information to obtain a first conversion result; performing the conversion process on the second feature information to obtain a second conversion result; performing a projection process on the first conversion result to obtain a first projection result; performing the projection process on the second conversion result to obtain a second projection result; obtaining a first error indicating an error between the first projection result and the second projection result; and training the second inference model by machine learning to reduce the first error. The conversion process produces an error between the first projection result and the second projection result that is greater than an error between a first non-conversion projection result and a second non-conversion projection result, where the first non-conversion projection result is obtained by performing the projection process on the first feature information, and the second non-conversion projection result is obtained by performing the projection process on the second feature information.

An information processing method according to one aspect of the present disclosure is an information processing method that is executed by a processor and includes: inputting first data to a first inference model to obtain first feature information; inputting the first data to a second inference model to obtain second feature information; performing a conversion process on the first feature information to obtain a first conversion result; performing the conversion process on the second feature information to obtain a second conversion result; performing a projection process on the first conversion result to obtain a first projection result; performing the projection process on the second conversion result to obtain a second projection result; obtaining a first error indicating an error between the first projection result and the second projection result; training a third inference model by machine learning to reduce the first error; and performing a model conversion process of converting the trained third inference model, to update the second inference model. The conversion process produces an error between the first projection result and the second projection result that is greater than an error between a first non-conversion projection result and a second non-conversion projection result, where the first non-conversion projection result is obtained by performing the projection process on the first feature information, and the second non-conversion projection result is obtained by performing the projection process on the second feature information.

An information processing system according to one aspect of the present disclosure includes: an obtainer that obtains second data; and an inference unit that inputs the second data obtained by the obtainer to a second inference model, and obtains and outputs a second inference result. The second inference model is a model obtained by executing an information processing method that is executed by a processor and includes: inputting first data to a first inference model to obtain first feature information; inputting the first data to a second inference model to obtain second feature information; performing a conversion process on the first feature information to obtain a first conversion result; performing the conversion process on the second feature information to obtain a second conversion result; performing a projection process on the first conversion result to obtain a first projection result; performing the projection process on the second conversion result to obtain a second projection result; obtaining a first error indicating an error between the first projection result and the second projection result; and training the second inference model by machine learning to reduce the first error. The conversion process produces an error between the first projection result and the second projection result that is greater than an error between a first non-conversion projection result and a second non-conversion projection result, where the first non-conversion projection result is obtained by performing the projection process on the first feature information, and the second non-conversion projection result is obtained by performing the projection process on the second feature information.

An information processing system according to one aspect of the present disclosure includes: an obtainer that obtains second data; and an inference unit that inputs the second data obtained by the obtainer to a second inference model, and obtains and outputs a second inference result. The second inference model is a model obtained by executing an information processing method that is executed by a processor and includes: inputting first data to a first inference model to obtain first feature information; inputting the first data to a second inference model to obtain second feature information; performing a conversion process on the first feature information to obtain a first conversion result; performing the conversion process on the second feature information to obtain a second conversion result; performing a projection process on the first conversion result to obtain a first projection result; performing the projection process on the second conversion result to obtain a second projection result; obtaining a first error indicating an error between the first projection result and the second projection result; training a third inference model by machine learning to reduce the first error; and performing a model conversion process of converting the trained third inference model, to update the second inference model. The conversion process produces an error between the first projection result and the second projection result that is greater than an error between a first non-conversion projection result and a second non-conversion projection result, where the first non-conversion projection result is obtained by performing the projection process on the first feature information, and the second non-conversion projection result is obtained by performing the projection process on the second feature information.

Advantageous Effects

With the information processing method and the like according to one aspect of the present disclosure, it is possible to reduce an inference result difference to be generated between two inference models, irrespective of the combination of input data.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 1 is a block diagram illustrating the functional configuration of an information processing system according to Embodiment 1.

FIG. 3 is a flowchart illustrating processing executed by the information processing system according to Embodiment 1.

FIG. 9 is a block diagram illustrating the functional configuration of an information processing system according to Embodiment 3.

FIG. 11 is a flowchart illustrating processing executed by the information processing system according to Embodiment 3.

FIG. 12 is a block diagram illustrating the functional configuration of an information processing system according to Embodiment 4.

FIG. 13 is a diagram illustrating a process of changing a projection process in the information processing system according to Embodiment 4.

FIG. 15 is a flowchart illustrating processing executed by the information processing system according to Embodiment 4.

FIG. 16 is a flowchart illustrating a process of changing a projection process in the processing executed by the information processing system according to Embodiment 4.

FIG. 17 is a block diagram illustrating the functional configuration of an information processing system according to Embodiment 5.

FIG. 18 is a diagram illustrating a process of changing a conversion process in the information processing system according to Embodiment 5.

FIG. 20 is a flowchart illustrating processing executed by the information processing system according to Embodiment 5.

FIG. 22 is a block diagram illustrating the functional configuration of an information processing system according to Embodiment 6.

FIG. 23 is a diagram illustrating a process of changing the combination of a conversion process and a projection process in the information processing system according to Embodiment 6.

FIG. 24 is a diagram illustrating training conducted by a second inference unit in the information processing system according to Embodiment 6.

FIG. 25 is a flowchart illustrating processing executed by the information processing system according to Embodiment 6.

FIG. 26 is a flowchart illustrating a process of changing the combination of a conversion process and a projection process in the processing executed by the information processing system according to Embodiment 6.

FIG. 27 is a flowchart illustrating processing executed by an information processing system according to a variation.

Figure 2:
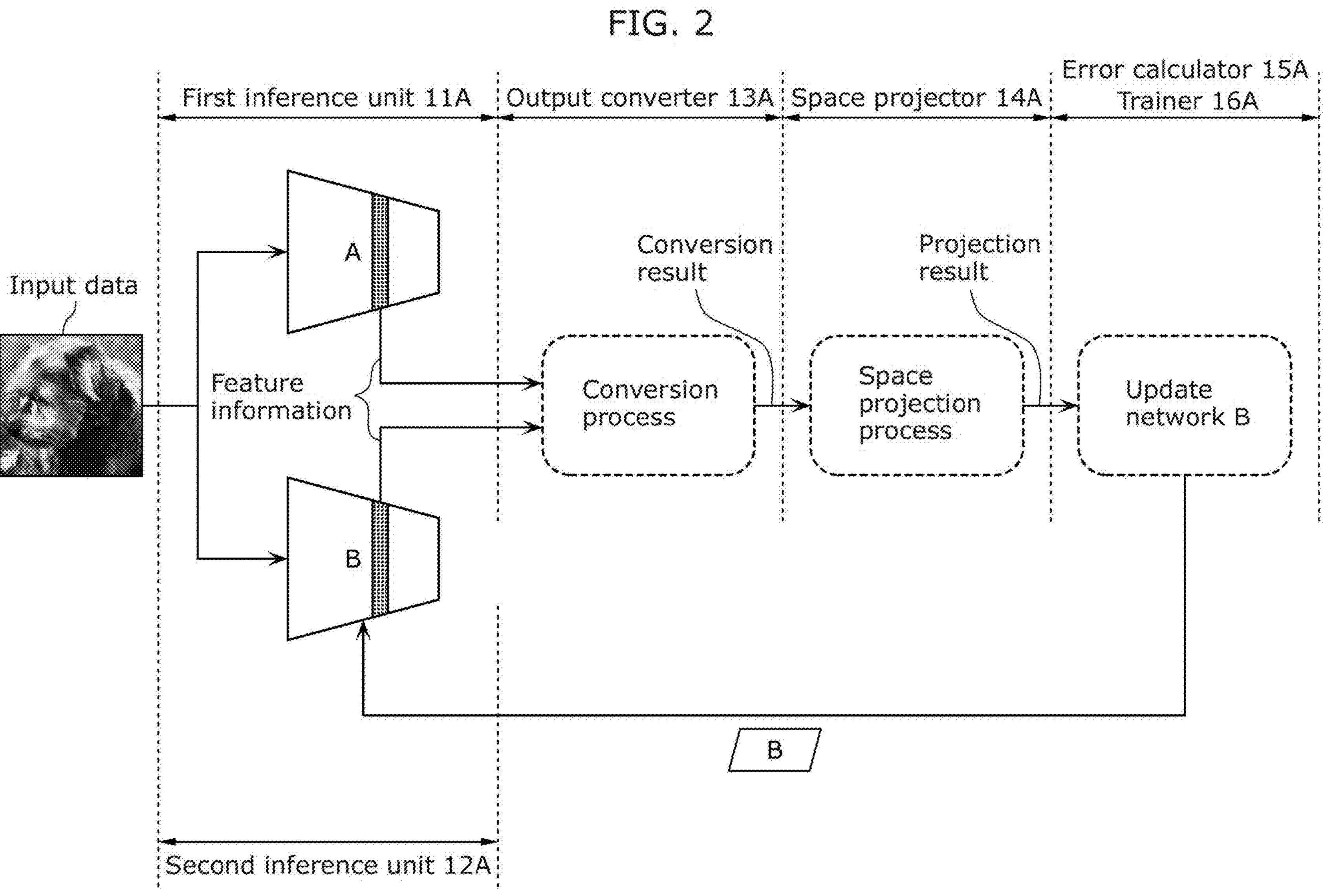
FIG. 2 is a diagram illustrating training conducted by a second inference unit in the information processing system according to Embodiment 1.

DESCRIPTION OF EMBODIMENTS (Circumstances Leading to the Present Disclosure)

In relation to the techniques disclosed in the Background section, the inventors have found the following problems.

In recent years, embedding an inference model trained by machine learning such as deep learning in an IoT device has been considered. In terms of cost and privacy, however, it is demanded that such an inference model be operated not in a cloud computing environment or an environment where a graphical processing unit (GPU) is used, but by a processor in a device with limited computing resources such as computing power and memory capacity. In order to perform inference using such a processor with limited computing resources, it is conceivable to compress an inference model using a method such as quantizing an inference model.

The technique disclosed in PTL 1, for example, changes a configuration for a machine learning process based on the computing resources and performance specifications of a system. Accordingly, inference performance is maintained to some extent even with limited computing resources and performance specifications. As used herein, inference performance is accuracy or the degree of precision of an inference result relative to correct answer data, and is the correct answer rate of an inference result relative to the entire input data, for example. When there are a plurality of inference targets in a single input data item, inference performance may be the correct answer rate of inference results relative to all the inference targets in the input data item.

A difference, however, may be generated between the behavior of an inference model that has not been compressed and the behavior of an inference model that has been compressed even though inference performance is maintained. Stated differently, a difference may be generated between an inference result obtained using an inference model that has not been compressed and an inference result obtained using an inference model that has been compressed.

In contrast, the technique disclosed in NPL 1 reduces, based on the distance between input data in a projection space, a difference in inference performance generated between two inference models whose input data are different. Accordingly, it is possible to reduce such an inference performance difference to some extent even though input data are different between two inference models.

Depending on the combination of input data, however, the distance between inference results in a projection space which are output by two inference models based on input data decreases, and training using a machine learning process may not proceed any further. When input data are same or similar to each other, for example, the distance, in a projection space, between inference results to be output decreases, and this may render the training difficult to proceed.

In view of such problems as described above, the inventors repeated dedicated studies and experiments. As a result, the inventors arrived at the subsequently described information processing method and the like according to one aspect of the present disclosure. The information processing method can reduce an inference result difference to be generated between two inference models, irrespective of the combination of input data.

An information processing method according to one aspect of the present disclosure is an information processing method that is executed by a processor and includes: inputting first data to a first inference model to obtain first feature information; inputting the first data to a second inference model to obtain second feature information; performing a conversion process on the first feature information to obtain a first conversion result; performing the conversion process on the second feature information to obtain a second conversion result; performing a projection process on the first conversion result to obtain a first projection result; performing the projection process on the second conversion result to obtain a second projection result; obtaining a first error indicating an error between the first projection result and the second projection result; and training the second inference model by machine learning to reduce the first error. The conversion process produces an error between the first projection result and the second projection result that is greater than an error between a first non-conversion projection result and a second non-conversion projection result, where the first non-conversion projection result is obtained by performing the projection process on the first feature information, and the second non-conversion projection result is obtained by performing the projection process on the second feature information.

According to the aspect, the information processing method performs a conversion process on first feature information and second feature information so that the error between a first projection result and a second projection result is greater than the error between a first non-conversion projection result and a second non-conversion projection result. As a result, it is possible to conduct training more smoothly than the case of using the error between a first non-conversion projection result and a second non-conversion projection result for training using a machine learning process. In addition, the information processing method trains a second inference model to reduce the error between a first projection result and a second projection result. As a result, the second inference model is trained to output the same inference result as that obtained using a first inference model. In other words, the information processing method can reduce an inference result difference to be generated between the first inference model and the second inference model. Specifically, the information processing method can thus reduce an inference result difference to be generated when obtaining a new inference model using an inference model as an exemplar. Accordingly, the information processing method can reduce an inference result difference to be generated between two inference models, irrespective of the combination of input data.

In the training of the second inference model, the second inference model may be trained by machine learning using also a second error indicating a difference between a first inference result and a second inference result, where the first inference result is additionally obtained by inputting the first data to the first inference model, and the second inference result is additionally obtained by inputting the first data to the second inference model.

According to the aspect, the second inference model is trained using also the error between an inference result for first data, which is obtained from the first inference model (a first inference result), and an inference result for the first data, which is obtained from the second inference model (a second inference result). Since the training is performed not only to reduce the difference between projection results but also to directly reduce the difference between an inference result obtained using the first inference model and an inference result obtained using the second inference model, it is possible to reduce even more an inference result difference to be generated between these two inference models.

An information processing method according to one aspect of the present disclosure is an information processing method that is executed by a processor and includes: inputting first data to a first inference model to obtain first feature information; inputting the first data to a second inference model to obtain second feature information; performing a conversion process on the first feature information to obtain a first conversion result; performing the conversion process on the second feature information to obtain a second conversion result; performing a projection process on the first conversion result to obtain a first projection result; performing the projection process on the second conversion result to obtain a second projection result; obtaining a first error indicating an error between the first projection result and the second projection result; training a third inference model by machine learning to reduce the first error; and performing a model conversion process of converting the trained third inference model, to update the second inference model. The conversion process produces an error between the first projection result and the second projection result that is greater than an error between a first non-conversion projection result and a second non-conversion projection result, where the first non-conversion projection result is obtained by performing the projection process on the first feature information, and the second non-conversion projection result is obtained by performing the projection process on the second feature information.

According to the aspect, the information processing method performs a conversion process on first feature information and second feature information so that the error between a first projection result and a second projection result is greater than the error between a first non-conversion projection result and a second non-conversion projection result. As a result, it is possible to conduct training more smoothly than the case of using the error between a first non-conversion projection result and a second non-conversion projection result for training using a machine learning process. In addition, the information processing method trains a third inference model to reduce the error between a first projection result and a second projection result. By obtaining a new second inference model from the trained third inference model through a model conversion process, a second inference model is updated. It can be said that as a result, the second inference model is indirectly trained to output the same inference result as that obtained using a first inference model. In other words, the information processing method can reduce an inference result difference to be generated between the first inference model and the second inference model. Specifically, the information processing method can reduce an inference result difference to be generated when obtaining a new inference model using an inference model as an exemplar. Accordingly, the information processing method can reduce an inference result difference to be generated between two inference models, irrespective of the combination of input data.

In the training of the third inference model, the third inference model may be trained by machine learning using also a second error indicating a difference between a first inference result and a second inference result, where the first inference result is additionally obtained by inputting the first data to the first inference model, and the second inference result is additionally obtained by inputting the first data to the second inference model According to the aspect, the third inference model is trained using also the error between an inference result for first data, which is obtained from a first inference model (a first inference result), and an inference result for the first data, which is obtained from a second inference model (a second inference result). By obtaining a second new inference model from the trained third inference model through a model conversion process, the second inference model is updated. Since the training is performed not only to reduce the difference between projection results but also to directly reduce the difference between an inference result obtained using the first inference model and an inference result obtained using the second inference model, it is possible to reduce even more an inference result difference to be generated between these two inference models.

The information processing method may further include changing the projection process to increase the first error.

According to the aspect, a projection process is changed to increase the error between a first projection result and a second projection result (a first error). This makes it possible to conduct training using a machine learning process more smoothly than the case of not changing the projection process. Stated differently, it is possible to inhibit the training from being retarded.

The information processing method may further include changing the conversion process to increase the first error.

According to the aspect, a conversion process is changed to increase the error between a first projection result and a second projection result (a first error). This makes it possible to conduct training using a machine learning process more smoothly than the case of not changing the conversion process. Stated differently, it is possible to inhibit the training from being retarded.

The information processing method may further include changing a combination of the conversion process and the projection process to increase the first error.

According to the aspect, the combination of a conversion process and a projection process is changed to increase the error between a first projection result and a second projection result (a first error). This makes it possible to conduct training using a machine learning process more smoothly than the case of not changing at least one of the conversion process or the projection process. Stated differently, it is possible to inhibit the training from being retarded.

The first inference model, the second inference model, and the third inference model may be each a neural network model, and the model conversion process may include a process of compressing the neural network model.

According to the aspect, a second inference model is obtained by compressing a neural network model which is a third inference model. This can reduce an inference result difference that may be generated when obtaining a new compressed second inference model using a first inference model as an exemplar. When obtaining a new compressed inference model using an inference model as an exemplar, the information processing method can thus reduce a difference to be generated between the first inference model and the second inference model. Accordingly, even in an environment where the computing resources of, for instance, an IoT device are limited, it is possible to apply a second inference model that exhibits a behavior similar to the behavior of a first inference model while maintaining inference performance.

The process of compressing the neural network model may include a process of quantizing the neural network model According to the aspect, a second inference model is obtained by quantizing a neural network model which is a third inference model. It is therefore possible to compress the neural network model without changing its network configuration, thereby inhibiting any change in inference performance and inference results (behaviors) before and after the compression.

The process of quantizing the neural network model may include a process of converting a coefficient in the neural network model from a floating-point format to a fixed-point format.

According to the aspect, a second inference model is obtained by converting coefficients (weights) included in a neural network model which is a third inference model from a floating-point format to a fixed-point format. It is therefore possible to adapt the second inference model to a general embedded environment while inhibiting any change in inference performance and inference results (behaviors).

The process of compressing the neural network model may include a process of reducing a total number of nodes in the neural network model or a process of removing a connection between nodes in the neural network model.

According to the aspect, a second inference model is obtained by reducing the number of nodes in a neural network model which is a third inference model or removing a connection between nodes in the neural network model. Since reduction in the number of nodes and the removal of the connection between nodes directly lead to reduction in the amount of computing, it is possible to adapt the second inference model to an environment where computing resources are strictly limited.

The conversion process may include a process of performing scale conversion on an input.

According to the aspect, a first conversion result and a second conversion result are obtained by changing the scales of first feature information and second feature information. Since this can, for example, remove or reduce a scale difference between the first feature information and the second feature information, it is possible to clarify the difference between the first feature information and the second feature information. Stated differently, the difference can be increased. As a result, since the difference between the first projection result and the second projection result is also clarified, it is possible to conduct training even more smoothly. Stated differently, it is possible to inhibit the training from being retarded. It can be said, from another perspective, that the difference between the distribution of the first feature information and the distribution of the second feature information can be clarified. By reducing these clarified differences through training using a machine learning process, an inference result difference to be generated between two inference models can be further reduced.

The projection process may include a process of projecting input to an inner product space.

According to the aspect, a first projection result and a second projection result can be obtained by projecting a first conversion result and a second conversion result to a space where an inner product is defined. Accordingly, it is possible to define the norm between the first projection result and the second projection result, thereby training a second inference model to reduce the norm, for example. As a result, the information processing method can reduce an inference result difference to be generated between two inference models.

The projection process may include a process of reducing a total number of dimensions of input.

According to the aspect, a first conversion result and a second conversion result are obtained by reducing the number of dimensions of the first conversion result and the number of dimensions of the second conversion result. Accordingly, by selecting a projection axis presenting the difference between the first conversion result and the second conversion result, and then performing a process of reducing the number of dimensions other than the selected projection axis, it is possible to obtain a first projection result and a second projection result. As a result, the information processing method can shorten even more a time required for calculating the error between the first projection result and the second projection result. In addition, the information processing method can effectively reduce an inference result difference to be generated between two inference models.

The process of reducing the total number of dimensions may include principal component analysis.

According to the aspect, a first projection result and a second projection result are obtained by performing principal component analysis on a first conversion result and a second conversion result and the process of reducing the number of dimensions. Since this reduces one or more principal components other than at least one specific principal component, it is possible to clarify the difference between the first projection result and the second projection result. For example, a principal component whose error (distance) between the distribution of the first projection result and the distribution of the second projection result is likely to be large compared with other principal components may be set for a specific principal component. As a result, the information processing method can shorten a time required for calculating the error between the first projection result and the second projection result. In addition, it is possible to effectively reduce an inference result difference to be generated between two inference models.

The first data may be image data.

According to the aspect, when obtaining a new inference model using, as an exemplar, an inference model for use in inference performed on image data, it is possible to reduce an inference result difference to be generated between a first inference model and a second inference model.

An information processing system according to one aspect of the present disclosure includes: an obtainer that obtains second data; and an inference unit that inputs the second data obtained by the obtainer to a second inference model, and obtains and outputs a second inference result.

The second inference model is a model obtained by executing an information processing method that is executed by a processor and includes: inputting first data to a first inference model to obtain first feature information; inputting the first data to a second inference model to obtain second feature information; performing a conversion process on the first feature information to obtain a first conversion result; performing the conversion process on the second feature information to obtain a second conversion result; performing a projection process on the first conversion result to obtain a first projection result; performing the projection process on the second conversion result to obtain a second projection result; obtaining a first error indicating an error between the first projection result and the second projection result; and training the second inference model by machine learning to reduce the first error. The conversion process produces an error between the first projection result and the second projection result that is greater than an error between a first non-conversion projection result and a second non-conversion projection result, where the first non-conversion projection result is obtained by performing the projection process on the first feature information, and the second non-conversion projection result is obtained by performing the projection process on the second feature information.

According to the aspect, the information processing system can (i) execute an inference process using a new inference model generated using an existing inference model as an exemplar to reduce an inference result difference, and (ii) output the inference result. It is thus possible to utilize, instead of the existing inference model, the new inference model that produces a small inference result difference. Stated differently, the information processing system can reduce an inference result difference to be generated between two inference models, irrespective of the combination of input data.

An information processing system according to one aspect of the present disclosure includes: an obtainer that obtains second data; and an inference unit that inputs the second data obtained by the obtainer to a second inference model, and obtains and outputs a second inference result. The second inference model is a model obtained by executing an information processing method that is executed by a processor and includes: inputting first data to a first inference model to obtain first feature information; inputting the first data to a second inference model to obtain second feature information; performing a conversion process on the first feature information to obtain a first conversion result; performing the conversion process on the second feature information to obtain a second conversion result; performing a projection process on the first conversion result to obtain a first projection result; performing the projection process on the second conversion result to obtain a second projection result; obtaining a first error indicating an error between the first projection result and the second projection result; training a third inference model by machine learning to reduce the first error; and performing a model conversion process of converting the trained third inference model, to update the second inference model. The conversion process produces an error between the first projection result and the second projection result that is greater than an error between a first non-conversion projection result and a second non-conversion projection result, where the first non-conversion projection result is obtained by performing the projection process on the first feature information, and the second non-conversion projection result is obtained by performing the projection process on the second feature information.

According to the aspect, the information processing system can (i) execute an inference process using a new inference model generated using an existing inference model as an exemplar to reduce an inference result difference, and (ii) output the inference result. Stated differently, the information processing system can reduce an inference result difference to be generated between two inference models, irrespective of the combination of input data.

These general or specific aspects may be implemented using a system, a device, an integrated circuit, a computer program, or a computer-readable recording medium such as a CD-ROM, or any combination of systems, devices, integrated circuits, computer programs, or computer-readable recording media.

Hereinafter, certain exemplary embodiments are described in greater detail with reference to the accompanying Drawings.

Each of the exemplary embodiments described below shows a general or specific example of the present disclosure. The numerical values, shapes, materials, elements, the arrangement and connection of the elements, steps, an order of the steps, etc., shown in the following exemplary embodiments are mere examples, and therefore do not limit the scope of the appended Claims and their equivalents. Therefore, among the elements in the following exemplary embodiments, those not recited in any one of the independent claims are described as optional elements.

Embodiment 1

Embodiment 1 will describe an information processing method and an information processing system that reduce, irrespective of the combination of input data, an inference result difference that may be generated when obtaining a new inference model using an inference model as an exemplar.

FIG. 1 is a block diagram illustrating the functional configuration of information processing system 10A according to Embodiment 1. Information processing system 10A is a system for obtaining a new inference model trained to output the same inference result as that obtained using an existing inference model.

As illustrated in FIG. 1, information processing system 10A includes first inference unit 11A, second inference unit 12A, output converter 13A, space projector 14A, error calculator 15A, trainer 16A, and training controller 17A.

Information processing system 10A is implemented by, for example, a processor (e.g., a central processing unit (CPU)) executing a program stored in memory in a computer device including the processor and the memory. Information processing system 10A may be implemented by a single device or a plurality of devices that are mutually communicable.

First inference unit 11A and second inference unit 12A each infer data that has been input (also referred to as input data) using an inference model. The inference model is, for example, a neural network model. The input data is, for example, image data. Hereinafter, description is provided assuming that input data is image data, but input data does not necessarily need to be limited to an example in which input data is image data. For example, audio data output from a microphone, point cloud data output from a radar such as light detection and ranging (LiDAR), compression data output from a compression sensor, temperature data output from a temperature sensor, moisture data output from a moisture sensor, or sensing data such as aroma data output from an aroma sensor may be used as input data. Input data is equivalent to first data.

First inference unit 11A obtains network A as a neural network used for an inference model that infers input data. More specifically, first inference unit 11A obtains coefficients included in network A. An inference model that uses network A is equivalent to "an existing inference model" and is also referred to as a first inference model.

First inference unit 11A outputs feature information (also referred to as first feature information) and an inference result obtained by inputting input data to an inference model that uses network A (also referred to as a first inference result).

Second inference unit 12A obtains network B as a neural network used for an inference model that infers input data. More specifically, second inference unit 12A obtains coefficients included in network B. An inference model that uses network B is equivalent to a new inference model trained to output the same inference result as that obtained using an existing inference model, and is also referred to as a second inference model. The inference model that uses network B is trained by trainer 16A to output the same inference result as that obtained using the inference model that uses network A, as will be described later.

Second inference unit 12A outputs feature information (also referred to as second feature information) and an inference result obtained by inputting input data to an inference model that uses network B (also referred to as a second inference result).

As used herein, an inference result is information indicating the result of inferring input data and includes, for example, information indicating an object or conditions shown in image data, or an attribute thereof. The inference result may include a feature which is information indicating a feature of input data. The inference result may be intermediate data obtained in the middle of processing performed by an inference model or the feature may be the intermediate data.

It is assumed herein that the feature is intermediate data of processing performed by an inference model. In other words, it is assumed that feature information is intermediate output of an inference model. For example, when input data is image data, feature information is a feature map indicating a feature of the image data. The inference model may be a model that outputs feature information as final output.

Output converter 13A obtains feature information output by first inference unit 11A and second inference unit 12A, and converts the obtained feature information using a conversion process. More specifically, output converter 13A obtains first feature information from first inference unit 11A and second feature information from second inference unit 12A. Output converter 13A then converts each of the obtained first feature information and second feature information using the conversion process, and obtains conversion results regarding the feature information input. In other words, output converter 13A outputs a conversion result which is the result of converting the first feature information using the conversion process (also referred to as a first conversion result) and a conversion result which is the result of converting the second feature information using the conversion process (also referred to as a second conversion result).

The conversion process produces an error between (i) a projection result indicating the result of projecting the first conversion result using a projection process performed by space projector 14A to be described later (also referred to as a first projection result), and (ii) a projection result indicating the result of projecting the second conversion result using the projection process (also referred to as a second projection result), which is greater than the error between (iii) a projection result indicating the result of projecting the first feature information (also referred to as a first non-conversion projection result), and (iv) a projection result indicating the result of projecting the second feature information (also referred to as a second non-conversion projection result).

Space projector 14A obtains conversion results output by output converter 13A and projects the obtained conversion results using a projection process. More specifically, space projector 14A obtains the first conversion result and the second conversion result from output converter 13A. Space projector 14A then projects, using the projection process, each of the conversion results obtained from output converter 13A, and obtains projection results regarding the conversion results that have been input. In other words, space projector 14A outputs a projection result which is the result of projecting the first conversion result using the projection process (also referred to as a first projection result), and a projection result which is the result of projecting the second conversion result using the projection process (also referred to as a second projection result).

Error calculator 15A obtains projection results output by space projector 14A and calculates the error between the obtained projection results. More specifically, error calculator 15A obtains the first projection result and the second projection result output by space projector 14A. Error calculator 15A then calculates error information indicating the difference between the obtained first projection result and the obtained second projection result (also referred to as a first error). The error information is calculated by computing using a loss function held by error calculator 15A. The loss function is, for example, the norm (difference) between projection results in a projection space, and the norm is calculated, for example, using a function utilizing the sum of squares error between sets of coordinates each indicating a different one of the projection results. An error calculation method is not limited to the above example.

Trainer 16A trains an inference model that uses network B by machine learning. Trainer 16A obtains the first error calculated by error calculator 15A and trains the inference model that uses network B by machine learning to reduce the first error. More specifically, trainer 16A refers to a loss function held by error calculator 15A and updates coefficients included in network B to reduce the first error. A well-known technique such as a norm using a sum of square errors may be employed for the loss function.

Training controller 17A controls the training of an inference model that uses a neural network. More specifically, training controller 17A determines whether the difference between the behavior of network A and the behavior of network B updated by trainer 16A reaches required performance, and decides whether to train the inference model that uses network B based on the determination result. For example, training controller 17A obtains a first inference result output by first inference unit 11A and a second inference result output by second inference unit 12A having obtained network B updated by trainer 16A, and determines whether the difference between the first inference result and the second inference result is less than an allowed value.

When determining that the difference between the behavior of network A and the behavior of network B reaches the required performance, for example, training controller 17A ends the training of the inference model that uses network B.

More specifically, training controller 17A ends the training when the difference between the first inference result and the second inference result is less than the allowed value.

When determining that the difference between the behavior of network A and the behavior of network B does not reach the required performance, for example, training controller 17A continues the training of the inference model that uses network B. In this case, training controller 17A further trains the inference model that uses network B by, for example, causing each of first inference unit 11A and second inference unit 12A to input new input data and causing first inference unit 11A, second inference unit 12A, output converter 13A, space projector 14A, error calculator 15A, and trainer 16A to execute the above processing again using network A, new network B, and new inputs.

Hereinafter, the outline of updating network B performed by information processing system 10A will be described.

FIG. 2 is a diagram illustrating training conducted by second inference unit 12A in information processing system 10A according to Embodiment 1.

When input data is input, first inference unit 11A executes an inference process of inferring an image using an inference model that uses network A, and outputs feature information which is intermediate output. The feature information is, for example, an intermediate feature map in a neural network. The intermediate feature map includes a feature indicating a feature of image data. The same applies to the following description. The feature information output by first inference unit 11A is provided for output converter 13A.

When input data is input, second inference unit 12A executes an inference process of inferring an image using an inference model that uses network B, and outputs feature information which is intermediate output. The feature information is the same information as the feature information output by first inference unit 11A. The feature information output by second inference unit 12A is provided for output converter 13A.

Output converter 13A performs a conversion process on the feature information provided by first inference unit 11A and the feature information provided by second inference unit 12A. The conversion process is, for example, scale conversion of changing the range of a value indicated by the feature information. For example, conversion process f is linear scale conversion obtained by the following Equation 1 where x denotes input, and a denotes a coefficient used for the scale conversion.

$$f(x)=a\times x \quad \text{Equation 1}$$

The conversion process is not limited to the above example. With the conversion process, error E1 between a first projection result and a second projection result which are to be obtained through the following projection process becomes greater than error E0 between a first non-conversion projection result and a second non-conversion projection result which are to be obtained without the conversion process. Stated differently, such a conversion process (e.g., linear scale conversion coefficients) that produces error E1 greater than error E0 is set.

Space projector 14A performs a projection process on conversion results output by output converter 13A. The projection process is, for example, a process of reducing the number of dimensions of input or a principal component analysis process. At least one specific principal component is selected, and one or more principal components other than the at least one selected principal component are removed. In other words, when performing the above process on input of the n-th dimension to obtain a projection result of the m-th dimension (n>m), space projector 14A obtains input x=(x1, x2, . . . , xn) and outputs projection result y=(y1, y2, . . . , ym). The projection process is not limited to the above example.

Error calculator 15A calculates the error between the projection results output by space projector 14A. The error is, for example, the norm (distance) between projection results in a projection space, and the norm is calculated using, for example, a function utilizing the sum of squares error between sets of coordinates each indicating a different one of the projection results. In other words, when first projection result y1=(y11, y12, . . . , y1m) and second projection result y2=(y21, y22, . . . , y2m) are output as the projection results output by space projector 14A, error calculator 15A calculates the sum of squares error between projection result y1 and projection result y2 using the following Expression 2. An error calculation method is not limited to the above example.

$$(y11-y21)^2+(y12-y22)^2+\ldots+(y1m-y2m)^2 \quad \text{Expression 2}$$

Trainer 16A adjusts coefficients included in network B to reduce an error to be calculated by error calculator 15A. In this case, trainer 16A refers to a loss function and adjusts the coefficients to reduce the error through the coefficient adjustment. Trainer 16A thus updates network B by adjusting the coefficients in network B. The following describes processing executed by information processing system 10A configured as described above.

Figure 3:
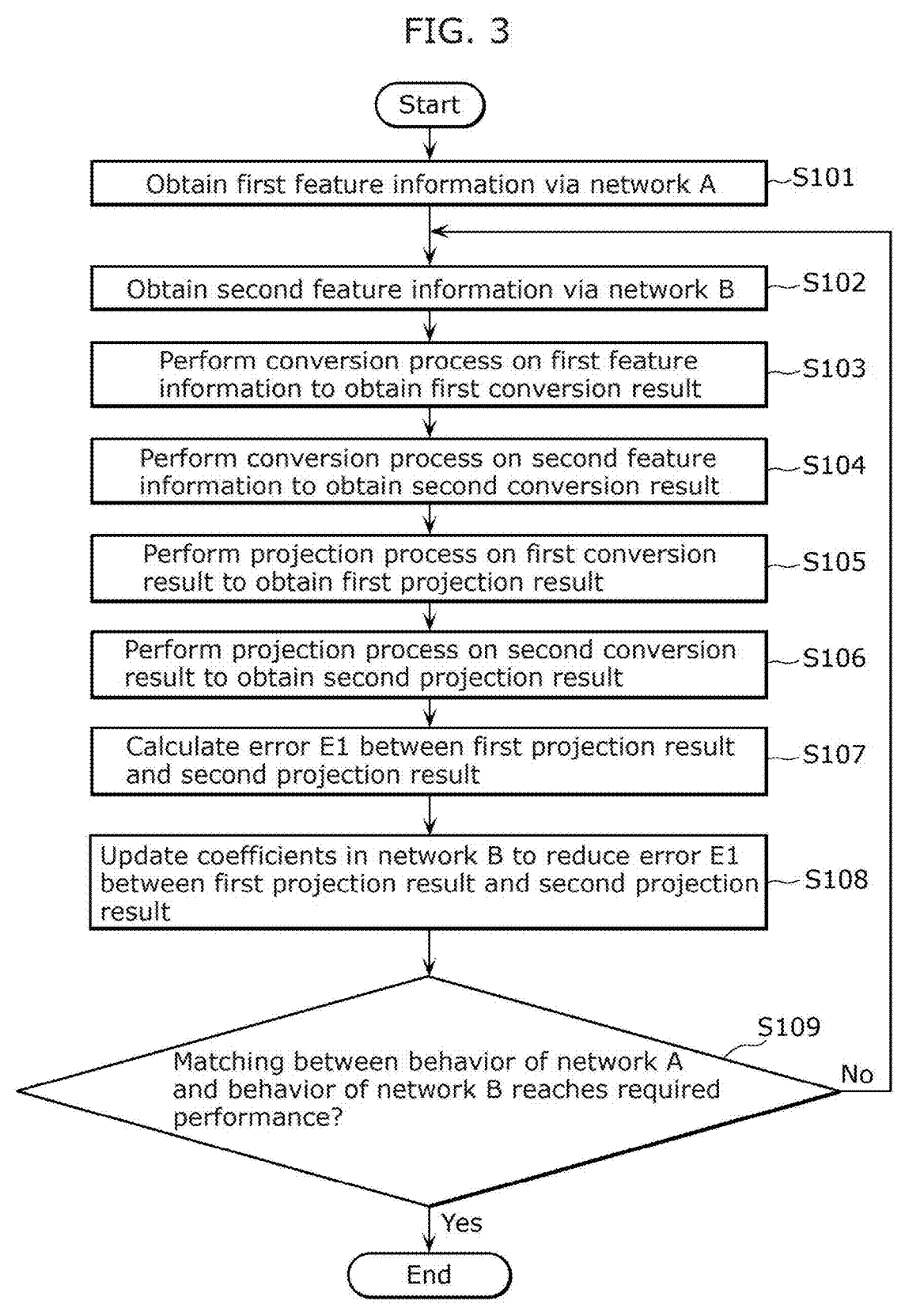

FIG. 3 is a flowchart illustrating processing (also referred to as an information processing method) executed by information processing system 10A according to Embodiment 1.

In step S101, first inference unit 11A inputs input data to an inference model that uses network A, and obtains first feature information via network A.

In step S102, second inference unit 12A inputs input data to an inference model that uses network B, and obtains second feature information via network B.

In step S103, output converter 13A performs a conversion process on the first feature information obtained by first inference unit 11A via network A in step S101, to obtain a first conversion result.

In step S104, output converter 13A performs the conversion process on the second feature information obtained by second inference unit 12A via network B in step S102, to obtain a second conversion result.

In step S105, space projector 14A performs a projection process on the first conversion result obtained by output converter 13A in step S103, to obtain a first projection result.

In step S106, space projector 14A performs the projection process on the second conversion result obtained by output converter 13A in step S104, to obtain a second projection result.

In step 107, error calculator 15A calculates error E1 between the first projection result obtained by space projector 14A in step S105 and the second projection result obtained by space projector 14A in step S106.

In step S108, trainer 16A updates coefficients in network B using error E1 calculated in step S107, to reduce error E1.

In step S109, training controller 17A determines whether the behavior difference between network A and network B updated by trainer 16A reaches required performance that is predetermined. In other words, training controller 17A determines whether the difference between an inference result obtained using the inference model that uses network A and an inference result obtained using the inference model that uses network B is less than an allowed value. When the difference reaches the required performance, information processing system 10A ends the processing. When the difference does not reach the required performance, information processing system 10A returns to the process in step S102 and repeats the same sequence of processes as described above.

Through the sequence of the processes described above, information processing system 10A performs a conversion process on first feature information obtained via network A and second feature information obtained via network B so that error E1 between a first projection result and a second projection result is greater than error E0 between a first non-conversion projection result and a second non-conversion projection result. As a result, it is possible to conduct training more smoothly than the case of using error E0 for training using a machine learning process. Moreover, information processing system 10A trains an inference model that uses network B to reduce error E1. As a result, the inference model that uses network B is trained to output the same inference result as that obtained using an inference model that uses network A. Information processing system 10A is thus capable of reducing an inference result difference that may be generated when obtaining a new inference model using the inference model that uses network A as an exemplar. Accordingly, it is possible to reduce, irrespective of the combination of input data, an inference result difference to be generated between the inference model that uses network A and the inference model that uses network B.

Next, inference system 20A that uses network B obtained using information processing system 10A will be described. An inference system is also referred to as an information processing system.

Figures 4, 5:
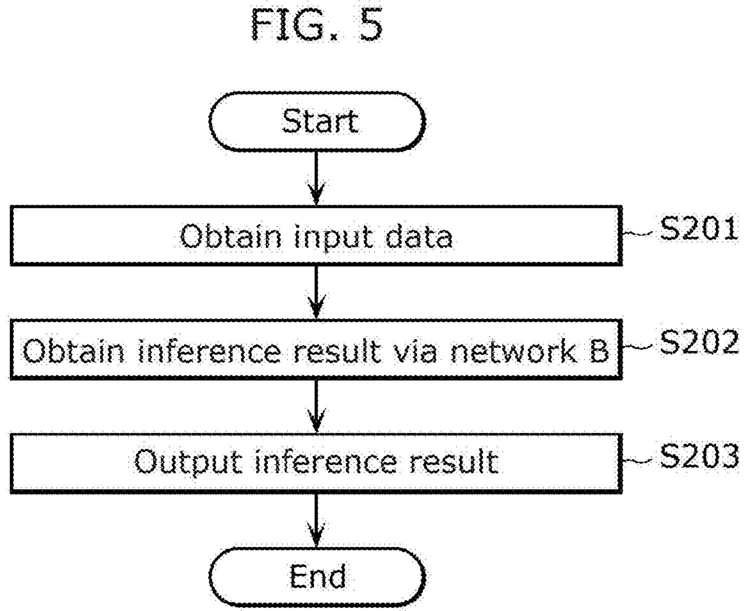
FIG. 4 is a block diagram illustrating the functional configuration of an inference system according to Embodiment 1.
FIG. 5 is a flowchart illustrating processing executed by the inference system according to Embodiment 1.

FIG. 4 is a block diagram illustrating the functional configuration of inference system 20A according to Embodiment 1.

As illustrated in FIG. 4, inference system 20A includes obtainer 21A and second inference unit 22A.

Inference system 20A is implemented by, for example, a processor (e.g., a CPU) executing a program stored in memory in a computer device including the processor and the memory.

Inference system 20A may be implemented by a single device or a plurality of devices that are mutually communicable.

Obtainer 21A obtains data that has been input (also referred to as input data). The input data is, for example, image data, as is the case of data to be input to information processing system 10A. Hereinafter, description is provided assuming that input data is image data, but input data does not necessarily need to be limited to an example in which input data is image data, as is the case of information processing system 10A.

Obtainer 21A provides the obtained input data for second inference unit 22A. Input data is equivalent to second data.

Second inference unit 22A inputs the input data obtained by obtainer 21A to an inference model (equivalent to a second inference model), and obtains and outputs an inference result. The inference model used by second inference unit 22A to obtain the inference result is an inference model that uses network B and has been trained by information processing system 10A.

FIG. 5 is a flowchart illustrating processing executed by inference system 20A according to Embodiment 1.

In step S201, obtainer 21A obtains input data.

Second inference unit 22A inputs the input data obtained by obtainer 21A to an inference model in step S202, and obtains and outputs an inference result in step S203.

Inference system 20A is thus capable of executing an inference process using a new inference model generated using an existing inference model as an exemplar to reduce an inference result difference, and outputting the inference result.

As described above, the information processing method according to Embodiment 1 performs a conversion process on first feature information and second feature information so that the error between a first projection result and a second projection result is greater than the error between a first non-conversion projection result and a second non-conversion projection result. As a result, it is possible to conduct training more smoothly than the case of using the error between a first non-conversion projection result and a second non-conversion projection result for training using a machine learning process. In addition, the information processing method trains a second inference model to reduce the error between a first projection result and a second projection result. As a result, a second inference model is trained to output the same inference result as that obtained using a first inference model. The information processing method can thus reduce an inference result difference that may be generated when obtaining a new inference model using an inference model as an exemplar. Accordingly, it is possible to reduce an inference result difference to be generated between two inference models, irrespective of the combination of input data. When obtaining a new inference model using, as an exemplar, an inference model used for inferring image data, it is possible to reduce an inference result difference to be generated between these two inference models.

With an information processing system according to Embodiment 1, it is possible to (i) execute an inference process using a new inference model generated using an existing inference model as an exemplar to reduce an inference result difference, and (ii) output the inference result. It is thus possible to utilize, instead of the existing inference model, the new inference model that produces a small inference result difference. Stated differently, the information processing system is capable of reducing an inference result difference to be generated between two inference models, irrespective of the combination of input data.

A first conversion result and a second conversion result are obtained by changing the scales of first feature information and second feature information. Accordingly, it is possible to remove or reduce a scale difference between the first feature information and the second feature information, thereby clarifying the difference between the first feature information and the second feature information. Stated differently, the difference can be increased.

As a result, since the difference between a first projection result and a second projection result is also clarified, it is possible to conduct training more smoothly. Stated differently, it is possible to inhibit training from being retarded. It can be also said, from another perspective, that the difference between the distribution of the first feature information and the distribution of the second feature information can be clarified. By reducing these clarified differences through training using a machine learning process, it is possible to further reduce an inference result difference to be generated between two inference models.

Embodiment 2

Embodiment 2 describes an information processing method and an information processing system that are different from the information processing method and the information processing system according to Embodiment 1, and that reduce, irrespective of the combination of input data, an inference result difference that may be generated when obtaining a new inference model using an inference model as an exemplar.

Hereinafter, an information processing system according to Embodiment 2 configured by modifying part of information processing system 10A according to Embodiment 1 will be described.

Elements of the information processing system according to Embodiment 2 that are same as those included in information processing system 10A according to Embodiment 1 are already described and therefore assigned with like reference signs, and detailed description thereof is omitted. The following focuses on the difference from information processing system 10A.

Figure 6:
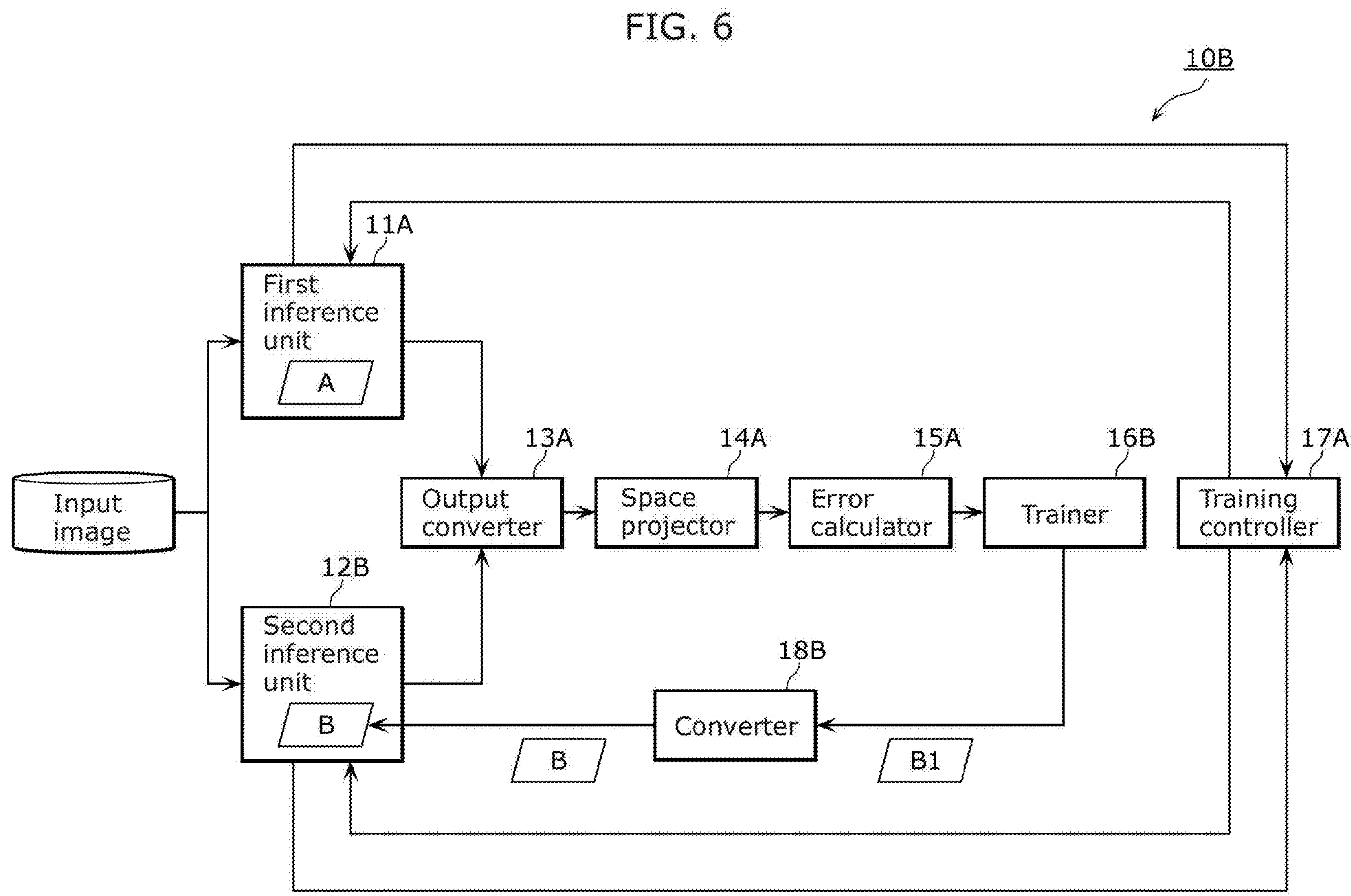
FIG. 6 is a block diagram illustrating the functional configuration of an information processing system according to Embodiment 2.

FIG. 6 is a block diagram illustrating the functional configuration of information processing system 10B according to Embodiment 2. Information processing system 10B is a system for obtaining a new inference model trained to output the same inference result as that obtained using an existing inference model.

The format of an existing inference model is different from the format of a new inference model. Specifically, network coefficients composing the existing inference model are expressed using a floating-point format whereas network coefficients composing the new inference model are expressed using a fixed-point format. In this case, it can be said, for example, that information processing system 10B is a system for obtaining a new network expressed using the fixed-point format by quantizing an existing inference model expressed using the floating-point format.

As illustrated in FIG. 6, information processing system 10B includes first inference unit 11A, second inference unit 12B, output converter 13A, space projector 14A, error calculator 15A, trainer 16B, training controller 17A, and converter 18B.

Among the elements included in information processing system 10B, first inference unit 11A, output converter 13A, space projector 14A, error calculator 15A, and training controller 17A are the same as those included in information processing system 10A according to Embodiment 1. The following therefore describes second inference unit 12B, trainer 16B, and converter 18B in detail.

Second inference unit 12B infers input data using an inference model, as is the case of second inference unit 12A according to Embodiment 1.

Second inference unit 12B obtains network B as a neural network used for an inference model that infers input data, as is the case of second inference unit 12A according to Embodiment 1. More specifically, second inference unit 12B obtains coefficients included in network B. An inference model that uses network B is equivalent to a new inference model trained to output the same inference result as that obtained using an existing inference model, and is also referred to as a second inference model.

Second inference unit 12B is different from second inference unit 12A according to Embodiment 1 in the following points: (A) second inference unit 12A according to Embodiment 1 obtains a network that is not subjected to network conversion; and (B) second inference unit 12B obtains network B that has been converted by converter 18B to be described later and that uses a format different from that of network A used for an existing inference model. Second inference unit 12B outputs feature information (also referred to as second feature information) and an inference result obtained by inputting input data to an inference model that uses network B (also referred to as a second inference result).

Trainer 16B trains an inference model that uses network B1 (also referred to as a third inference model) by machine learning. Network B1 is a network that uses the same format as that of network A used for an existing inference model. In other words, network B1 is a network that uses a format different from that of network B. Trainer 16B obtains a first error calculated by error calculator 15A and trains the inference model that uses network B1 by machine learning to reduce the first error. More specifically, trainer 16B refers to a loss function held by error calculator 15A, and updates coefficients included in network B1 to reduce the first error. The loss function is the same as that described in Embodiment 1.

Converter 18B obtains network B by performing a model conversion process on the coefficients in network B1. More specifically, converter 18B obtains network B1 trained by trainer 16B, and obtains network B by performing a predetermined model conversion process on the coefficients in network B1.

The model conversion process includes, for example, a process of compressing network B1. The compressing process includes, for example, a process of quantizing network B1. When network B1 is a neural network, for example, the quantizing process may include a process of converting coefficients in a neural network model from a floating-point format to a fixed-point format. The compressing process may include a process of reducing the number of nodes in the neural network model or removing a connection between nodes in the neural network model.

Figure 7:
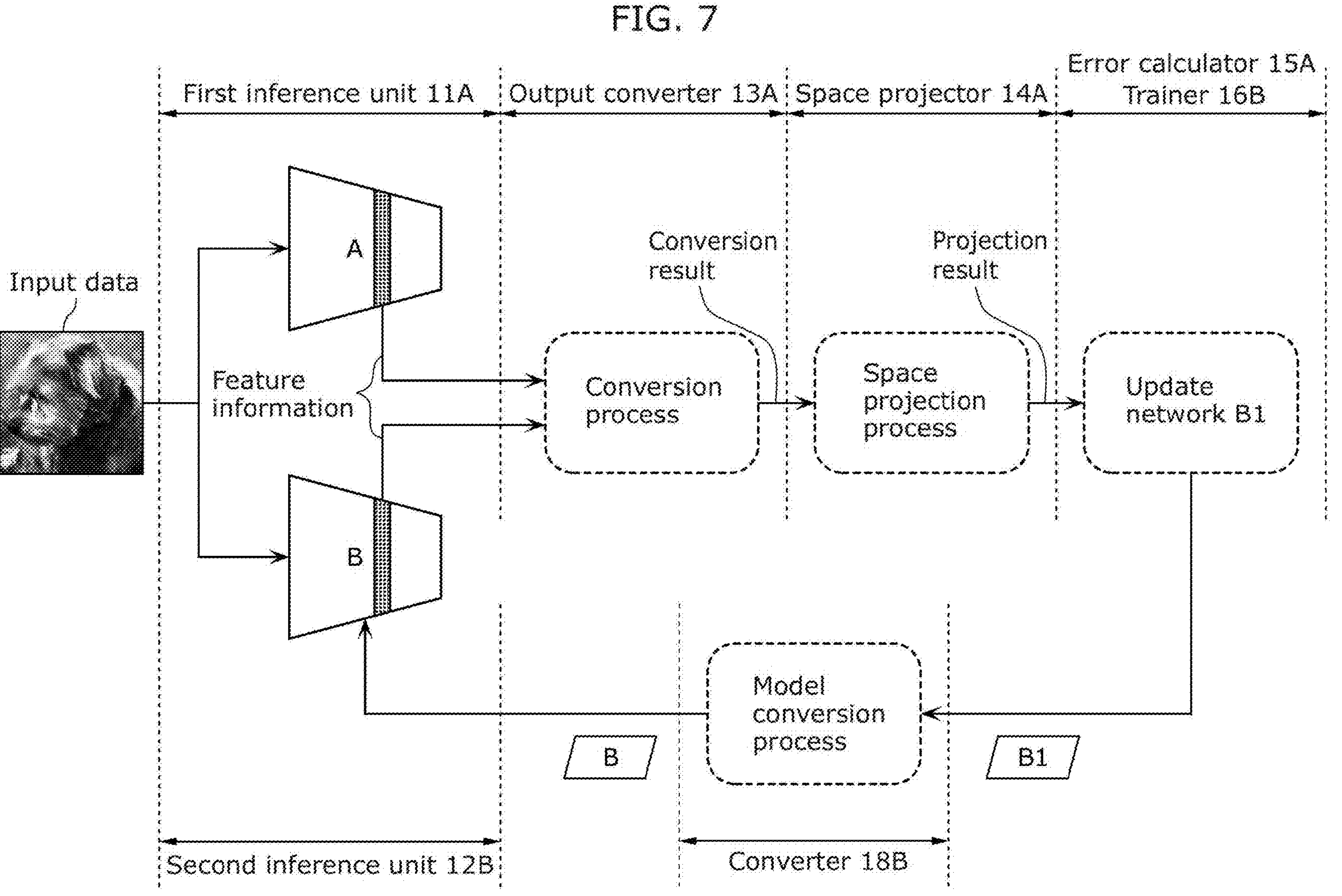
FIG. 7 is a diagram illustrating training conducted by a second inference unit in the information processing system according to Embodiment 2.

FIG. 7 is a diagram illustrating training conducted by second inference unit 12B in information processing system 10B according to Embodiment 2.

A process from when input data is input by first inference unit 11A until when an error is calculated by error calculator 15A is the same as that included in the training performed in information processing system 10A according to Embodiment 1.

After the error is calculated by error calculator 15A, trainer 16B adjusts the coefficients included in network B1 to reduce an error to be calculated by error calculator 15A. In this case, trainer 16B refers to a loss function and adjusts the coefficients to reduce the error through the coefficient adjustment. Trainer 16B thus updates network B1 by adjusting the coefficients in network B1.

Converter 18B obtains network B1 trained by trainer 16B and obtains new network B by performing a conversion process on the coefficients in network B1.

The following describes processing executed by information processing system 10B configured as described above.

Figure 8:
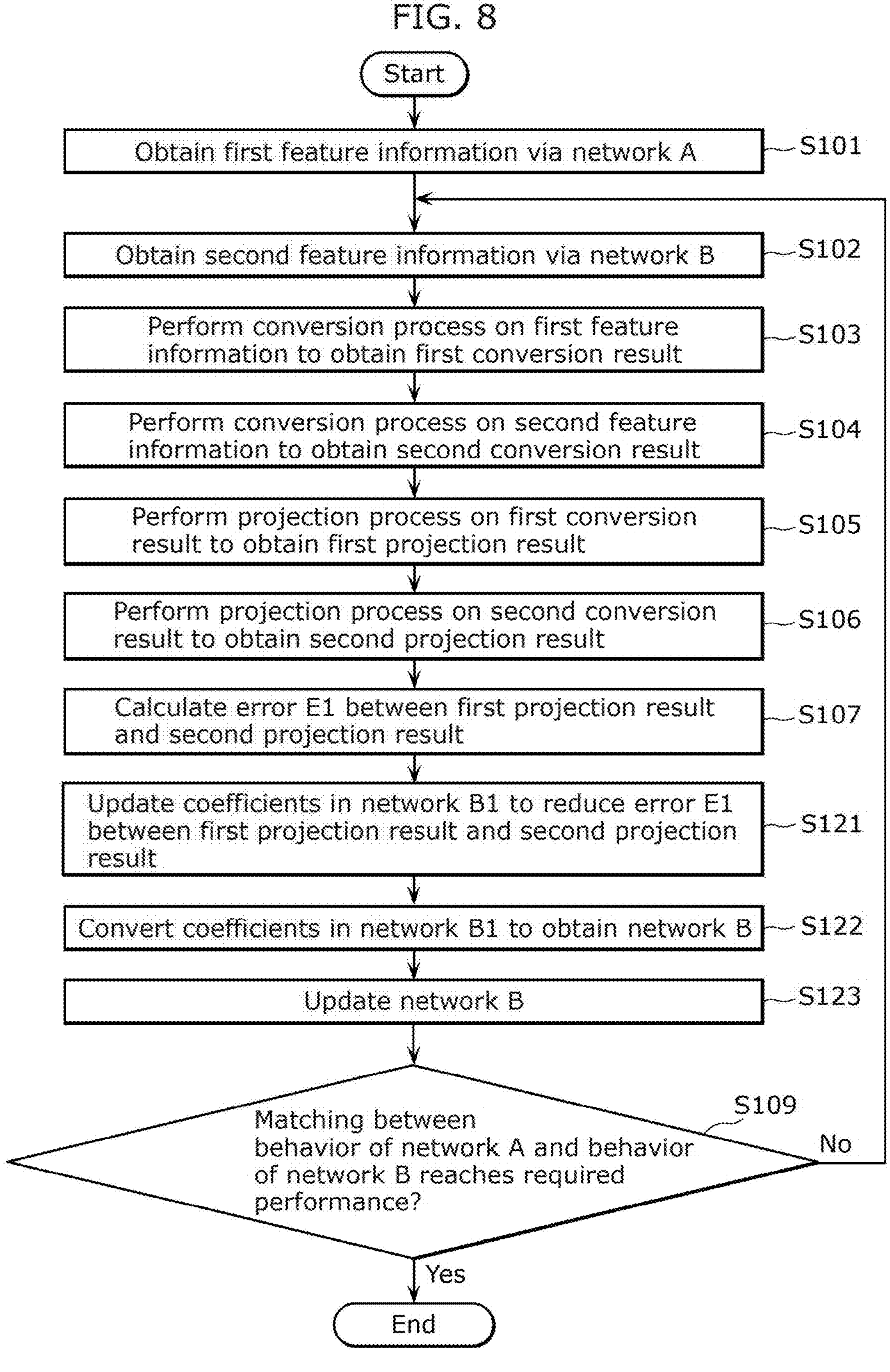
FIG. 8 is a flowchart illustrating processing executed by the information processing system according to Embodiment 2.

FIG. 8 is a flowchart illustrating processing (also referred to as an information processing method) executed by information processing system 10B according to Embodiment 2.

The processes included in steps S101 through S107 and S109 illustrated in FIG. 8 are the same processes as those performed by information processing system 10A according to Embodiment 1 (see FIG. 3, for instance).

In step S121, trainer 16B updates coefficients in network B1 to reduce error E1, using error E1 calculated by error calculator 15A in step S107.

In step S122, converter 18B obtains network B1 whose coefficients have been updated by trainer 16B in step S121, and obtains network B by converting the coefficients in network B1. In step S123, converter 18B updates, with network B1 obtained in step S122, network B input to inference unit 12B.

Through a sequence of the processes described above, information processing system 10B trains an inference model that uses network B1, to reduce the error between a first projection result and a second projection result. Information processing system 10B then updates network B by obtaining network B from trained network B1 through a model conversion process. As a result, an inference model that uses network B is trained to output the same inference result as that obtained using an inference model that uses network A. Information processing system 10B is thus capable of reducing an inference result difference that may be generated when obtaining an inference model that uses network B using an inference model that uses network A as an exemplar.

As described above, the information processing method according to Embodiment 2 performs a conversion process on first feature information and second feature information so that the error between a first projection result and a second projection result is greater than the error between a first non-conversion projection result and a second non-conversion projection result. As a result, it is possible to conduct training more smoothly than the case of using the error between a first non-conversion projection result and a second non-conversion projection result for training using a machine learning process. Moreover, the information processing method trains a third inference model to reduce the error between a first projection result and a second projection result. Subsequently, by obtaining a second inference model from the trained third inference model through a model conversion process, a second inference model is updated. It can be said that as a result, the second inference model is indirectly trained to output the same inference result as that obtained using a first inference model. In other words, the information processing method can reduce an inference result difference that may be generated between the first inference model and the second inference model. Specifically, it is possible to reduce an inference result difference that may be generated when obtaining a new inference model using an inference model as an exemplar. Accordingly, it is possible to reduce an inference result difference to be generated between two inference models, irrespective of the combination of input data.

A second inference model is obtained by compressing a neural network model which is a third inference model. Accordingly, it is possible to reduce an inference result difference that may be generated when obtaining a new compressed second inference model using a first inference model as an exemplar. Therefore, when obtaining a new compressed inference model using an inference model as an exemplar, the information processing method can reduce a difference generated between these two inference models. Accordingly, it is possible to apply, while maintaining inference performance, a second inference model whose behavior is similar to the behavior of a first inference model even in an environment where the computing resources of, for instance, an IoT device are limited.

A second inference model is obtained by quantizing a neural network model which is a third inference model. It is therefore possible to compress the neural network model without changing its network configuration and inhibit any change in inference performance and inference results (behaviors) before and after compression.

A second inference model is obtained by converting coefficients (weights) in a neural network model which is a third inference model from a floating-point format to a fixed-point format. It is therefore possible to adapt the second inference model to a general embedded environment while inhibiting any change in inference performance and inference results (behaviors).

A second inference model is obtained by reducing the number of nodes in a neural network model which is a third inference model or removing a connection between nodes in the neural network model. Since reduction in the number of nodes and the removal of the connection between nodes directly lead to reduction in the amount of computing, it is possible to adapt the second inference model to an environment where computing resources are strictly limited.

An inference model obtained using the configuration according to Embodiment 2 may be utilized in the inference system according to Embodiment 1. In this case, the inference system is capable of executing an inference process using a new inference model generated using an existing inference model as an exemplar to reduce an inference result difference, and outputting the inference result.

Embodiment 3

Embodiment 3 describes an information processing method and an information processing system that are different from the information processing method and the information processing system according to Embodiment 1 or Embodiment 2, and that reduce, irrespective of the combination of input data, an inference result difference that may be generated when obtaining a new inference model using an inference model as an exemplar.

Hereinafter, an information processing system according to Embodiment 3 configured by modifying part of information processing system 10A according to Embodiment 1 will be described.

Elements of the information processing system according to Embodiment 3 that are same as those included in information processing system 10A according to Embodiment 1 are already described and therefore assigned with like reference signs, and detailed description thereof is omitted. The following focuses on the difference from information processing system 10A.

FIG. 9 is a block diagram illustrating the functional configuration of information processing system 10C according to Embodiment 3. Information processing system 10C is a system for obtaining a new inference model trained to output the same inference result as that obtained using an existing inference model.

As illustrated in FIG. 9, information processing system 10C includes first inference unit 11C, second inference unit 12C, output converter 13A, space projector 14A, error calculator 15A, trainer 16C, training controller 17A, and second error calculator 19C.

Among the elements included in information processing system 10C, output converter 13A, space projector 14A, error calculator 15A, and training controller 17A are the same as those included in information processing system 10A according to Embodiment 1. The following therefore describes first inference unit 11C, second inference unit 12C, trainer 16C, and second error calculator 19C in detail.

First inference unit 11C has also the following function in addition to functions that are same as those of first inference unit 11A according to Embodiment 1. In other words, first inference unit 11C provides, for second error calculator 19C, an inference result obtained by inputting input data to an inference model that uses network A (also referred to as a first inference result).

Second inference unit 12C has also the following function in addition to functions that are same as those of second inference unit 12A according to Embodiment 1. In other words, second inference unit 12C provides, for second error calculator 19C, an inference result obtained by inputting input data to an inference model that uses network B (also referred to as a second inference result).

Although it is described herein assuming that (1) first inference unit 11C outputs a first inference result to second error calculator 19C and first feature information to output converter 13A, and second inference unit 12C outputs a second inference result to second error calculator 19C and second feature information to output converter 13A, (2) first inference unit 11C may output first feature information to second error calculator 19C and a first inference result to output converter 13A, and second inference unit 12C may output second feature information to second error calculator 19C and a second inference result to output converter 13A, or (3) first inference unit 11C may output a first inference result to both second error calculator 19C and output converter 13A, and second inference unit 12C may output a second inference result to both second error calculator 19C and output converter 13A, or (4) first inference unit 11C may output first feature information to both second error calculator 19C and output converter 13A, and second inference unit 12C may output second feature information to both second error calculator 19C and output converter 13A.

When first inference unit 11C and second inference unit 12C output a first inference result and a second inference result, respectively, to output converter 13A, output converter 13A is to obtain the first inference result and the second inference result and output: a first conversion result which is the result of converting the first inference result using a conversion process; and a second conversion result which is the result of converting the second inference result using the conversion process.

Second error calculator 19C calculates the error between the inference result output by first inference unit 11C and the inference result output by second inference unit 12C. In other words, second error calculator 19C calculates error information indicating the difference between the first inference result output by first inference unit 11C and the second inference result output by second inference unit 12C (also referred to as a second error). The error information is calculated by computing using a loss function held by second error calculator 19C. The loss function may be the same as that held by error calculator 15A according to Embodiment 1.

When first inference unit 11C and second inference unit 12C output the first feature information and the second feature information, respectively, to second error calculator 19C, second error calculator 19C is to calculate a second error indicating the difference between the first feature information and the second feature information.

Trainer 16C trains an inference model that uses network B by machine learning. Trainer 16C obtains the first error calculated by error calculator 15A and the second error calculated by second error calculator 19C, and trains the inference model that uses network B by machine learning to reduce the first error and the second error. More specifically, trainer 16C refers to loss functions held by error calculator 15A and second error calculator 19C, and updates coefficients included in network B to reduce the first error and the second error. A well-known technique such as a norm using a sum of squares error may be employed for the loss functions.

Figure 10:
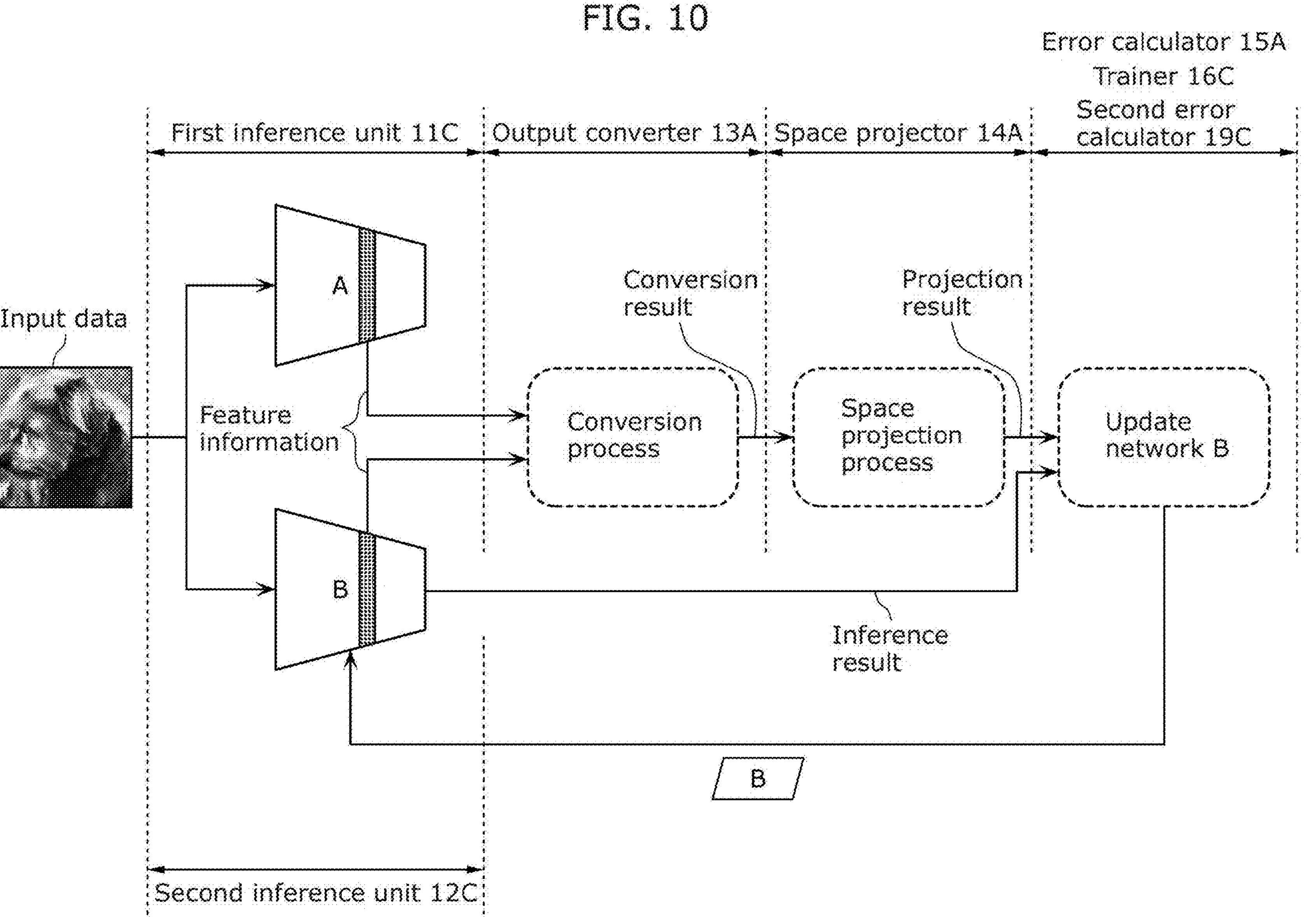
FIG. 10 is a diagram illustrating training conducted by a second inference unit in the information processing system according to Embodiment 3.

FIG. 10 is a diagram illustrating training conducted by second inference unit 12C in information processing system 10C according to Embodiment 3.

A process from when input data is input by first inference unit 11C until when an error is calculated by error calculator 15A is the same as that included in the training performed in information processing system 10A according to Embodiment 1

When input data is input, first inference unit 11C executes an inference process of inferring an image using an inference model that uses network A, and outputs the inference result. The inference result is, for example, information indicating "dog: 70%, cat: 30%". The inference result indicates that a probability that an object in an input image is a dog is 70% and a probability that the object is a cat is 30%. The same applies to the following description. The inference result output by first inference unit 11C is provided for second error calculator 19C.

When input data is input, second inference unit 12C executes an inference process of inferring an image using an inference model that uses network B, and outputs the inference result. The inference result is same kind of information as that output by first inference unit 11C. The inference result output by second inference unit 12C is provided for second error calculator 19C.

Second error calculator 19C calculates the error between the inference result output by first inference unit 11C and the inference result output by second inference unit 12C. Specifically, when information "dog: 70%, cat: 30%" is obtained as an inference result obtained using the inference model that uses network A and information "dog:60%, cat: 40%" is obtained as an inference result obtained using the inference model that uses network B, second error calculator 19C obtains an error calculated from 0.02 which is a sum of 0.01 that is the square of a probability difference related to a dog (0.7-0.6) in the inference results and 0.01 that is the square of a probability difference related to a cat (0.3-0.4) in the inference results.

Trainer 16C adjusts coefficients included in network B to reduce errors to be calculated by error calculator 15A and second error calculator 19C. Trainer 16C refers to the loss functions and adjusts the coefficients to reduce the errors through the coefficient adjustment.

Trainer 16C thus updates network B by adjusting the coefficients in network B.

The following describes processing executed by information processing system 10C configured as described above.

FIG. 11 is a flowchart illustrating processing (also referred to as an information processing method) executed by information processing system 10C according to the present embodiment.

The processes included in steps S101 through S107 and S109 illustrated in FIG. 11 are the same processes as those performed by information processing system 10A according to Embodiment 1 (see FIG. 3, for instance).

In step S141, first inference unit 11C inputs input data to an inference model that uses network A, and obtains a first inference result via network A.

In step S142, second inference unit 12C inputs input data to an inference model that uses network B, and obtains a second inference result via network B.

In step S143, second error calculator 19C calculates error E2 between the first inference result obtained by first inference unit 11C in step S141 and the second inference result obtained by second inference unit 12C in step S142.

In step S108C, trainer 16C updates coefficients in network B to reduce error E1 calculated by error calculator 15A in step S107 and error E2 calculated by second error calculator 19C in step S143.

Through a sequence of the processes described above, information processing system 10C trains an inference model that uses network B to reduce error E1 between a first projection result and a second projection result. Information processing system 10C also trains the inference model that uses network B to reduce error E2 between a first inference result and a second inference result. As a result, the inference model that uses network B is further trained to output the same inference result as that obtained using an inference model that uses network A. Information processing system 10C is thus capable of reducing an inference result difference that may be generated when obtaining a new inference model using the inference model that uses network A as an exemplar. Accordingly, it is possible to further reduce, irrespective of the combination of input data, an inference result difference to be generated between the inference model that uses network A and the inference model that uses network B.

As described above, the information processing method according to Embodiment 3 trains a second inference model using also the error between an inference result for first data, which is obtained from a first inference model (a first inference result) and an inference result for the first data, which is obtained from a second inference model (a second inference result). Accordingly, since the second inference model is trained not only to reduce the difference between projection results but also to directly reduce the difference between an inference result obtained using the first inference model and an inference result obtained using the second inference model, it is possible to further reduce the inference result difference to be generated between these two inference models.

The configuration according to Embodiment 3 may be applied to Embodiment 2. In this case, a third inference model is trained using also the error between an inference result for first data, which is obtained from a first inference model (a first inference result) and an inference result for the first data, which is obtained from a second inference model (a second inference result). By obtaining a new second inference model from the trained third inference model through a conversion process, a second inference model is updated. Accordingly, it is possible to further reduce the difference between an inference result to be obtained using the first inference model and an inference result to be obtained using the second inference model, and thus further reduce the inference result difference to be generated between these two inference models.

Embodiment 4

Embodiment 4 describes an information processing method and an information processing system that are different from the information processing method and the information processing system according to each of Embodiments 1 through 3, and that reduce, irrespective of the combination of input data, an inference result difference that may be generated when obtaining a new inference model using an inference model as an exemplar.

Hereinafter, an information processing system according to Embodiment 4 configured by modifying part of information processing system 10A according to Embodiment 1 will be described. Elements of the information processing system according to Embodiment 4 that are same as those included in information processing system 10A according to Embodiment 1 are already described and therefore assigned with like reference signs, and detailed description thereof is omitted. The following focuses on the difference from information processing system 10A.

The present embodiment describes aspects different from those of the information processing method and the information processing system according to each of Embodiments 1 through 3. Elements that are substantially same as those described in each of Embodiments 1 through 3 are assigned with like reference signs, and detailed description thereof will be omitted.

FIG. 12 is a block diagram illustrating the functional configuration of information processing system 10D according to Embodiment 4. Information processing system 10D is a system for obtaining a new inference model trained to output the same inference result as that obtained using an existing inference model.

As illustrated in FIG. 12, information processing system 10D includes first inference unit 11A, second inference unit 12A, output converter 13A, space projector 14D, error calculator 15D, trainer 16A, training controller 17D, and first selector 51D.

Among the elements included in information processing system 10D, first inference unit 11A, second inference unit 12A, output converter 13A, and trainer 16A are the same as those included in information processing system 10A according to Embodiment 1. The following therefore describes space projector 14D, error calculator 15D, training controller 17D, and first selector 51D in detail.

Space projector 14D has also the following functions in addition to functions that are same as those of space projector 14A according to Embodiment 1. In other words, space projector 14D obtains a projection process resulting from recording or changing performed by first selector 51D. Space projector 14D then projects a conversion result obtained from output converter 13A using the projection process obtained from first selector 51D, and outputs the projection result regarding the conversion result that has been input. Space projector 14D also notifies first selector 51D of the projection process executed by space projector 14D. The details of the projection process recording and changing performed by first selector 51D will be described later.

Error calculator 15D has also the following function in addition to functions that are same as those of error calculator 15A according to Embodiment 1. In other words, error calculator 15D outputs, to first selector 51D, error information calculated based on a projection result obtained from space projector 14D (also referred to as a first error).

First selector 51D changes a projection process to be executed by space projector 14D so that a value indicated by error information to be calculated by error calculator 15D increases. Specifically, first selector 51D records a combination of an executed projection process and calculated error information, and changes the projection process based on one or more recorded combinations. First selector 51D records a combination of a projection process to be executed by space projector 14D and error information to be calculated by error calculator 15D, based on the result of comparing (i) the combination of the projection process executed by space projector 14D and the error information calculated by error calculator 15D with (ii) each of one or more combinations each being made up of a projection process and error information which are placed in the record by first selector 51D.

Specifically, first, first selector 51D obtains a projection process executed by space projector 14D and a first error calculated by error calculator 15D. First selector 51D refers to one or more combinations each being made up of a projection process and error information recorded by first selector 51D. When the combination of the obtained projection process and the obtained first error is not present among the one or more recorded combinations, that is, when the combination of the obtained projection process and the obtained first error is a combination of a projection process and error information obtained for the first time by first selector 51D, first selector 51D records the projection process and the first error. When the combination of the obtained projection process and the obtained first error is present among the one or more recorded combinations, first selector 51D compares the first error with error information in a recorded combination matching the combination. When the first error is greater than the error information in the recorded combination, first selector 51D records the projection process and the first error. When the first error is less than the error information in the recorded combination, first selector 51D does not perform the recording process and keeps the projection process and the error information in the recorded combination.

First selector 51D refers to a history of comparisons made between combinations, and when there is a projection process candidate that has not yet been compared, changes a projection process to be executed by space projector 14D. When there is no such projection process candidate, first selector 51D changes the projection process to be executed by space projector 14D to a projection process placed in the record by first selector 51D, and ends the projection process recording and changing processes. The projection process may be, for example, a process of projecting input to an inner product space (projection process A) or a process of reducing the number of dimensions of input (projection process B). The process of reducing the number of dimensions of input may include principal component analysis. Projection process candidates may include projection processes of different types such as projection process A and projection process B, or projection processes of the same type each having process parameters different from any of the other projection processes.

The projection process recording and changing processes performed by first selector 51D may be ended based on a threshold value that is preset. In that case, first selector 51D compares the first error and the threshold value. When the first error is greater than the threshold value, first selector 51D records the projection process and the first error, changes the projection process to be executed by space projector 14D to the projection process recorded by first selector 51D, and ends the projection process recording and changing processes. When the first error is less than the threshold value, first selector 51D refers to one or more combinations each being made up of a projection process and error information recorded by first selector 51D and repeats the subsequent processes in the same manner, to change the projection process to be executed by space projector 14D.

The projection process recording and changing processes performed by first selector 51D may be performed again based on network B updated by trainer 16A. In that case, first selector 51D receives an instruction from training controller 17D and executes the processes described above in the same manner, to change the projection process to be executed by space projector 14D.

Training controller 17D has also the following functions in addition to functions that are same as those of training controller 17A according to Embodiment 1. In other words, training controller 17D causes first selector 51D to perform again the projection process changing process based on network B updated by trainer 16A. For example, training controller 17D further trains an inference model that uses network B by causing each of first inference unit 11A and second inference unit 12A to input new input data and causing first inference unit 11A, second inference unit 12A, output converter 13A, space projector 14D, error calculator 15D, first selector 51D, and trainer 16A to perform the above processing again, using network A, new network B, and new inputs.

FIG. 13 is a diagram illustrating a process of changing a projection process in information processing system 10D according to Embodiment 4.

A process from when input data is input by first inference unit 11A until when an error is calculated by error calculator 15D is the same as that included in the training performed in information processing system 10A according to Embodiment 1.

After the error is calculated by error calculator 15D, first selector 51D changes a projection process to be executed by space projector 14D so that an error to be calculated by error calculator 15D increases. When the projection process to be executed by space projector 14D is a projection process of reducing the number of dimensions of input of n-th dimension to obtain a projection result of m-th dimension ($n>m$), for example, the process of changing the projection process includes a process of increasing or decreasing the dimension m of the projection result, which is a parameter, and a process of changing a combination of projection axes. The details of the procedure of the projection process changing process performed by first selector 51D will be described later.

Figure 14:
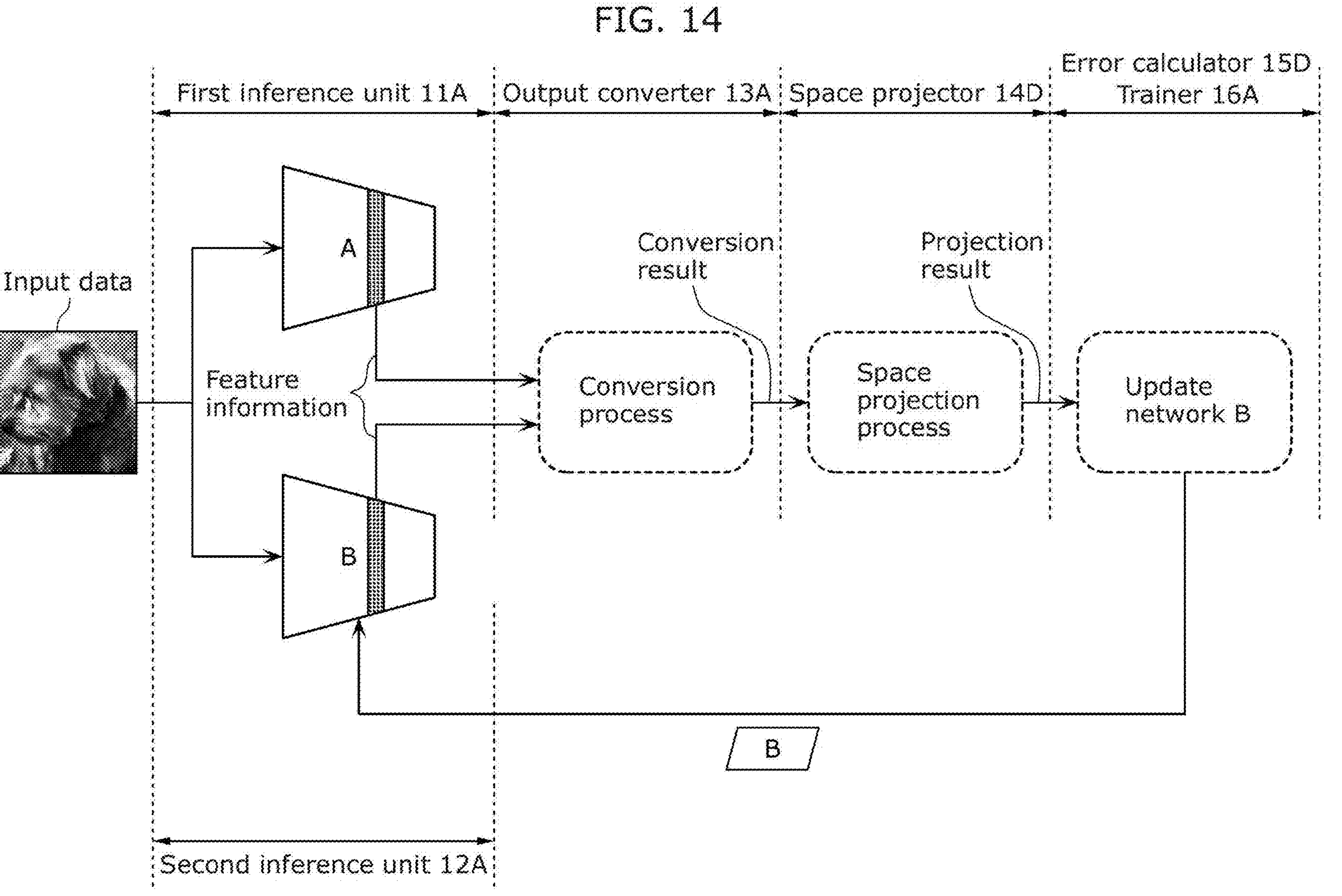
FIG. 14 is a diagram illustrating training conducted by a second inference unit in the information processing system according to Embodiment 4.

FIG. 14 is a diagram illustrating training conducted by second inference unit 12A in information processing system 10D according to Embodiment 4.

A process from when input data is input by first inference unit 11A until when network B is updated by trainer 16A is the same as that included in the training performed in information processing system 10A according to Embodiment 1.

A projection process to be executed by space projector 14D is a process resulting from the projection process changing performed by first selector 51D. When first selector 51D changes the projection process to be executed by space projector 14D to a projection process of reducing the number of dimensions of input of n-th dimension to obtain a projection result of k-th dimension ($n>k$), for example, space projector 14D obtains input $x=(x1, x2, \ldots, xn)$ and outputs projection result $z=(z1, z2, \ldots, zk)$.

Error calculator 15D calculates the error between projection results output by space projector 14D. The error is, for example, the norm (distance) between projection results in a projection space, and the norm is calculated using, for example, a function utilizing the sum of squares error between sets of coordinates each indicating a different one of the projection results. In other words, when first projection result $z1=(z11, z12, \ldots, z1k)$ and second projection result $z2=(z21, z22, \ldots, z2k)$ are output as the projection results output by space projector 14D, error calculator 15D calculates the sum of squares error between projection result z1 and projection result z2 using the following Expression 3. An error calculation method is not limited to the above example.

$$(z11-z21)^2+(z12-z22)^2+\ldots+(z1k-z2k)^2 \quad \text{Expression 3}$$

Trainer 16A adjusts coefficients included in network B to reduce an error to be calculated by error calculator 15D. In this case, trainer 16A refers to a loss function and adjusts the coefficients to reduce the error through the coefficient adjustment. Trainer 16A thus updates network B by adjusting the coefficients in network B.

The following describes processing executed by information processing system 10D configured as described above.

FIG. 15 and FIG. 16 are each a flowchart illustrating processing (also referred to as an information processing method) executed by information processing system 10D according to Embodiment 4. FIG. 15 is a flowchart illustrating processes resulting from excluding the projection process changing process from processes executed by information processing system 10D according to Embodiment 4. FIG. 16 is a flowchart illustrating the projection process changing process among the processes executed by information processing system 10D according to Embodiment 4.

The processes included in steps S101 through S109 in FIG. 15 are the same processes as those performed by information processing system 10A according to Embodiment 1 (see FIG. 3, for instance).

In step S161, first selector 51D firstly determines whether to perform a threshold process to be described later. When determining not to perform the threshold process, first selector 51D performs a process in step S163 to be described later. When determining to perform the threshold process, first selector 51D determines whether error E1 calculated by error calculator 15D in step S107 is greater than a threshold value determined in advance. When error E1 is greater than the threshold value, first selector 51D performs a process in step S162 to be described later. When error E1 is less than the threshold value, first selector 51D performs the process in step S163.

In step S162, first selector 51D records the combination of the projection process executed by space projector 14D and error E1.

In step S163, first selector 51D determines whether the error calculation process performed by error calculator 15D in step S107 is error calculation performed for the first time or whether error E1 calculated by error calculator 15D in step S107 is greater than a recorded error. In other words, first selector 51D refers to one or more combinations recorded by first selector 51D and when the combination of the projection process executed by space projector 14D and error E1 is not in the record, determines that the error calculation process is error calculation process performed for the first time and performs a process in step S162D to be described later. When the combination is in the record and error E1 is greater than an error in a recorded combination matching the combination, first selector 51D performs the process in step S162D. When error E1 is less than the error in the recorded combination, first selector 51D performs a process in step S164 to be described later.

In step S162D, first selector 51D records the combination of the projection process performed by space projector 14D and error E1.

In step S164, first selector 51D refers to a history of comparisons made between combinations, and determines whether there is any projection process candidate that has not yet been compared. When such a projection process candidate is present, first selector 51D performs a process in step S165 to be described later. When there is no such projection process candidate, first selector 51D performs a process in step S105D to be described later.

In step S165, first selector 51D changes the projection process to be executed by space projector 14D.

In step S105D, space projector 14D performs, on the first conversion result obtained by output converter 13A in step S103, the projection process in the combination recorded by first selector 51D in step S162 or step S162D, and obtains a first projection result.

In step S106D, space projector 14D performs, on the second conversion result obtained by output converter 13A in step S104, the projection process in the combination recorded by first selector 51D in step S162 or step S162D, and obtains a second projection result.

In step S107D, error calculator 15D calculates error E1 between the first projection result obtained by space projector 14D in step S105D and the second projection result obtained by space projector 14D in step S106D.

In step S166, training controller 17D determines whether first selector 51D is to change again the projection process every time trainer 16A updates coefficients in network B. When first selector 51D changes again the projection process based on updated network B, information processing system 10D returns to the process in step S105. When first selector 51D does not change again the projection process, information processing system 10D returns to the process in step S105D and repeats the same sequence of processes as described above.

Through the sequence of the processes described above, information processing system 10D changes a projection process so that error E1 between a first projection result and a second projection result increases, and then trains an inference model that uses network B to reduce error E1 between a first projection result and a second projection result. As a result, it is possible to conduct training by machine learning more smoothly than the case of not changing the projection process. Stated differently, it is possible to inhibit the training from being retarded.

As described above, the information processing method according to Embodiment 4 changes a projection process so that the error between a first projection result and a second projection result (a first error) increases. Accordingly, it is possible to conduct training by machine learning more smoothly than the case of not changing the projection process. Stated differently, it is possible to inhibit the training from being retarded.

A first projection result and a second projection result are obtained by projecting a first conversion result and a second conversion result to a space where an inner product is defined. Accordingly, it is possible to define the norm between the first projection result and the second projection result, thereby training a second inference model to, for example, reduce the norm. As a result, the information processing method can reduce an inference result difference to be generated between two inference models.

A first projection result and a second projection result are obtained by reducing the number of dimensions of a first conversion result and the number of dimensions of a second conversion result. Accordingly, it is possible to, for example, firstly select a projection axis presenting the difference between a first conversion result and a second conversion result, subsequently perform a process of reducing the number of dimensions other than the selected projection axis, and obtain the first projection result and the second projection result. As a result, the information processing method can further shorten a time required for calculating the error between the first projection result and the second projection result. In addition, the information processing method can effectively reduce an inference result difference to be generated between two inference models.

A first projection result and a second projection result are obtained by performing principal component analysis on a first conversion result and a second conversion result, and subsequently performing the process of reducing the number of dimensions. Accordingly, it is possible to clarify the difference between the first projection result and the second projection result since one or more principal components other than at least one specific principal component are removed. A principal component, which is likely to produce an error (distance) between the distribution of first projection result and the distribution of second projection result that is greater than an error produced by any other principal component, may be set for a specific principal component. As a result, the information processing method can further shorten a time required for calculating the error between the first projection result and the second projection result. In addition, the information processing method can effectively reduce an inference result difference to be generated between two inference models.

The configuration according to Embodiment 4 may be applied to Embodiment 2 or Embodiment 3.

Embodiment 5

Embodiment 5 describes an information processing method and an information processing system that are different from the information processing method and the information processing system according to each of Embodiments 1 through 4, and that reduce, irrespective of the combination of input data, an inference result difference that may be generated when obtaining a new inference model using an inference model as an exemplar.

Hereinafter, an information processing system according to Embodiment 5 configured by modifying part of information processing system 10A according to Embodiment 1 will be described.

FIG. 17 is a block diagram illustrating the functional configuration of information processing system 10E according to Embodiment 5. Information processing system 10E is a system for obtaining a new inference model trained to output the same inference result as that obtained using an existing inference model.

As illustrated in FIG. 17, information processing system 10E includes first inference unit 11A, second inference unit 12A, output converter 13E, space projector 14A, error calculator 15E, trainer 16A, training controller 17E, and second selector 52E.

Among the elements included in information processing system 10E, first inference unit 11A, second inference unit 12A, space projector 14A, and trainer 16A are the same as those included in information processing system 10A according to Embodiment 1. The following therefore describes output converter 13E, error calculator 15E, training controller 17E, and second selector 52E in detail.

Output converter 13E has also the following functions in addition to functions that are same as those of output converter 13A according to Embodiment 1. In other words, output converter 13E obtains a conversion process resulting from recording or changing performed by second selector 52E. Output converter 13E then converts feature information obtained from first inference unit 11A and feature information obtained from second inference unit 12A, using the conversion process obtained from second selector 52E, and outputs conversion results regarding the feature information input. Output converter 13E also notifies second selector 52E of the conversion process executed by output converter 13E. The details of the conversion process recording and changing performed by second selector 52E will be described later.

Error calculator 15E has also the following function in addition to functions that are same as those of error calculator 15A according to Embodiment 1. In other words, error calculator 15E outputs, to second selector 52E, error information calculated based on projection results obtained from space projector 14A (also referred to as a first error).

Second selector 52E changes a conversion process to be executed by output converter 13E so that a value indicated by error information to be calculated by error calculator 15E increases. Specifically, second selector 52E records a combination of an executed conversion process and calculated error information, and changes the conversion process based on one or more recorded combinations. Second selector 52E records a combination of a conversion process to be executed by output converter 13E and error information to be calculated by error calculator 15E, based on the result of comparing (i) the combination of the conversion process executed by output converter 13E and the error information calculated by error calculator 15E with (ii) each of one or more combinations each being made up of a conversion process and error information which are placed in the record by second selector 52E.

Specifically, first, second selector 52E obtains a conversion process executed by output converter 13E and a first error calculated by error calculator 15E. Second selector 52E refers to one or more combinations each being made up of a conversion process and error information recorded by second selector 52E. When the combination of the obtained conversion process and the obtained first error is not present among the one or more recorded combinations, that is, when the combination of the obtained conversion process and the obtained first error is a combination of a conversion process and error information obtained for the first time by second selector 52E, second selector 52E records the conversion process and the first error. When the combination of the obtained conversion process and the obtained first error is present among the one or more recorded combinations, second selector 52E compares the first error with error information in a recorded combination matching the combination. When the first error is greater than the error information in the recorded combination, second selector 52E records the conversion process and the first error. When the first error is less than the error information, second selector 52E does not perform the recording process and keeps the conversion process and the error information in the recorded combination.

Second selector 52E refers to a history of comparisons made between combinations. When there is a conversion process candidate that has not yet been compared, second selector 52E changes a conversion process to be executed by output converter 13E. When there is no such conversion process candidate, second selector 52E changes the conversion process to be executed by output converter 13E to a conversion process placed in the record by second selector 52E, and ends the conversion process recording and changing processes. The conversion process may be, for example, a process of performing scale conversion on an input. Conversion process candidates may include conversion processes of different types such as conversion process A and conversion process B, or conversion processes of the same type each having process parameters different from those of any of the other conversion processes. The conversion process may be a conversion process using a neural network model and the process parameters may be neural network coefficients.

The conversion process recording and changing processes performed by second selector 52E may be ended based on a threshold value that is preset. In that case, second selector 52E compares the first error and the threshold value. When the first error is greater than the threshold value, second selector 52E records the conversion process and the first error, changes the conversion process to be executed by output converter 13E to the conversion process recorded by second selector 52E, and ends the conversion process recording and changing processes. When the first error is less than the threshold value, second selector 52E refers to one or more combinations each being made up of a conversion process and error information recorded by second selector 52E, and repeats the subsequent processes in the same manner, to change the conversion process to be executed by output converter 13E.

The conversion process recording and changing processes performed by second selector 52E may be performed again based on network B updated by trainer 16A. In that case, second selector 52E receives an instruction from training controller 17E and executes the processes described above in the same manner, to change the conversion process.

Training controller 17E has also the following functions in addition to functions that are same as those of training controller 17A according to Embodiment 1. In other words, training controller 17E causes second selector 52E to perform again the conversion process changing process based on network B updated by trainer 16A. For example, training controller 17E further trains an inference model that uses network B by causing each of first inference unit 11A and second inference unit 12A to input new input data and causing first inference unit 11A, second inference unit 12A, output converter 13E, space projector 14A, error calculator 15E, second selector 52E, and trainer 16A to perform the above processing again, using network A, new network B, and new inputs.

Figure 18:
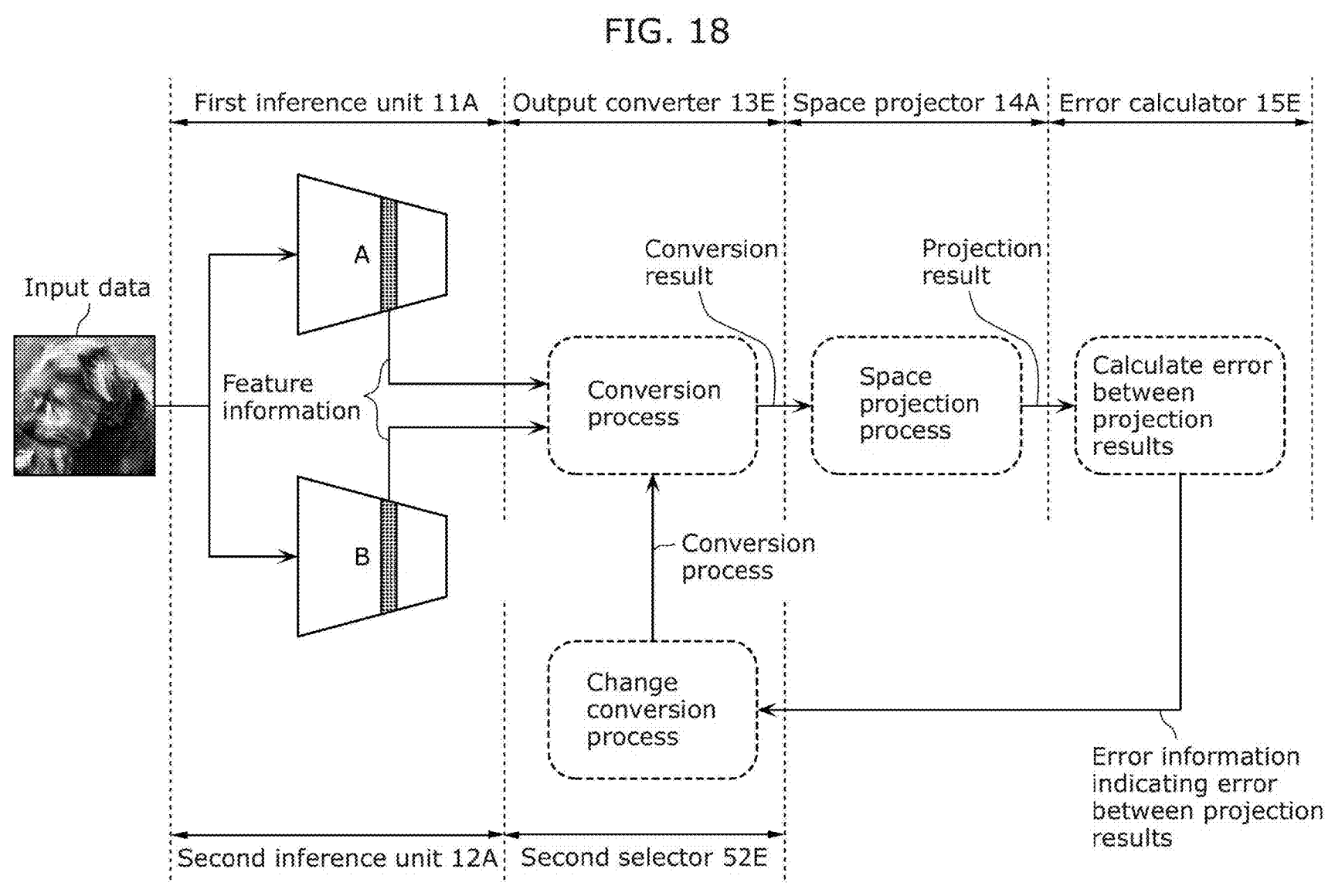

FIG. 18 is a diagram illustrating a process of changing a conversion process in information processing system 10E according to Embodiment 5.

A process from when input data is input by first inference unit 11A until when an error is calculated by error calculator 15E is the same as that included in the training performed in information processing system 10A according to Embodiment 1.

After the error is calculated by error calculator 15E, second selector 52E changes a conversion process to be executed by output converter 13E so that an error to be calculated by error calculator 15E increases. When the conversion process to be executed by output converter 13E is scale conversion f of changing the range of a value indicated by feature information, which is obtained using Equation 1, for example, the process of changing the conversion process includes a process of changing parameter a and a process of changing a function used for scale conversion to scale conversion f2 obtained using the following Equation 4. The details of the procedure of the conversion process changing process performed by second selector 52E will be described later.

$$f2(x)=a\times\tanh(x) \quad \text{Equation 4}$$

Figure 19:
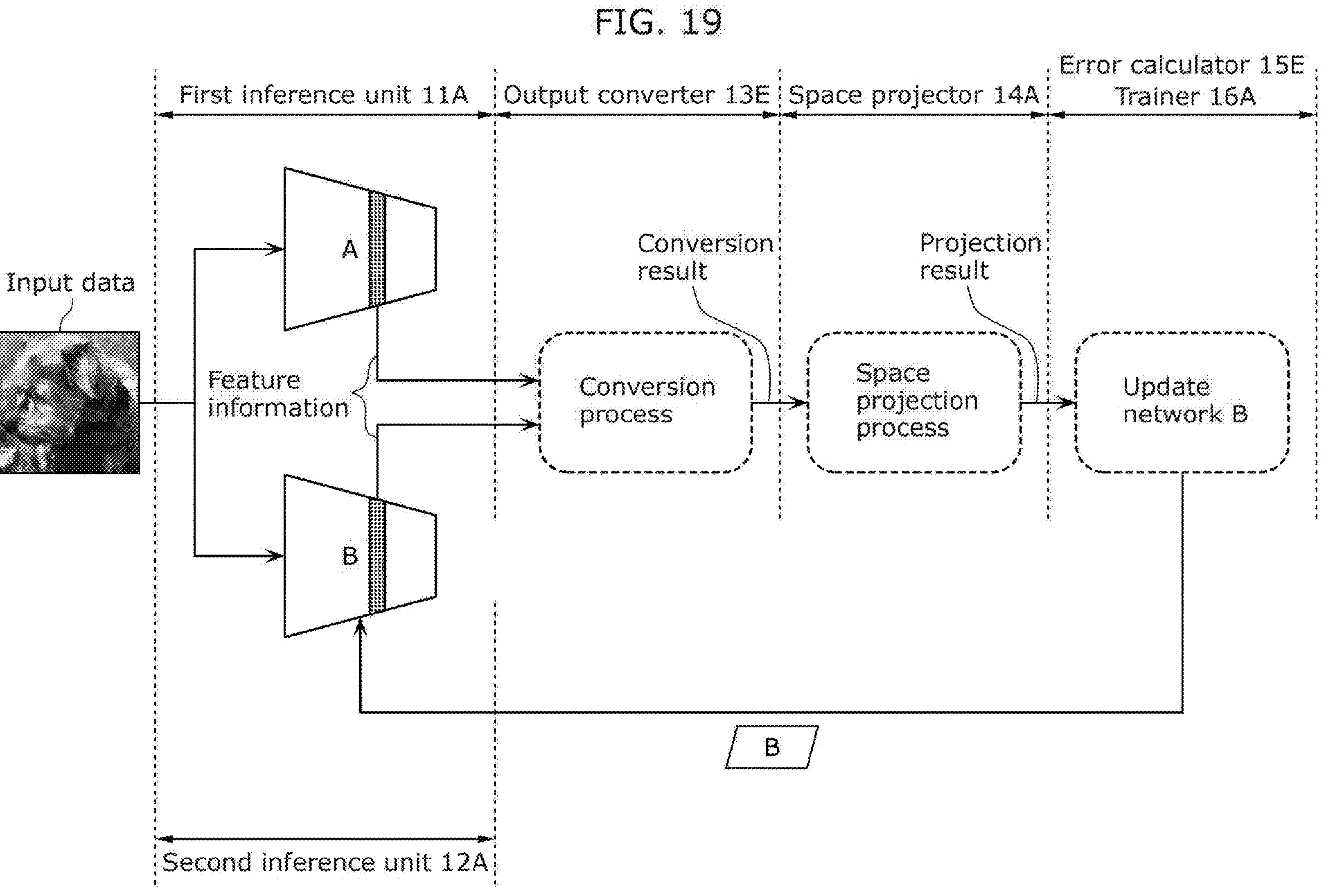
FIG. 19 is a diagram illustrating training conducted by a second inference unit in the information processing system according to Embodiment 5.

FIG. 19 is a diagram illustrating training conducted by second inference unit 12A in information processing system 10E according to Embodiment 5.

A process from when input data is input by first inference unit 11A until when network B is updated by trainer 16A is the same as that included in the training performed in information processing system 10A according to Embodiment 1.

A conversion process to be executed by output converter 13E is a process resulting from the conversion process changing performed by second selector 52E. When second selector 52E changes the conversion process to be executed by output converter 13E to scale conversion f2 obtained using Equation 4, for example, output converter 13E obtains input x and outputs conversion result f2(x).

The subsequent processes after the conversion results are input to space projector 14A are the same as those included in the training performed in information processing system 10A according to Embodiment 1.

The following describes processing executed by information processing system 10E configured as described above.

Figure 21:
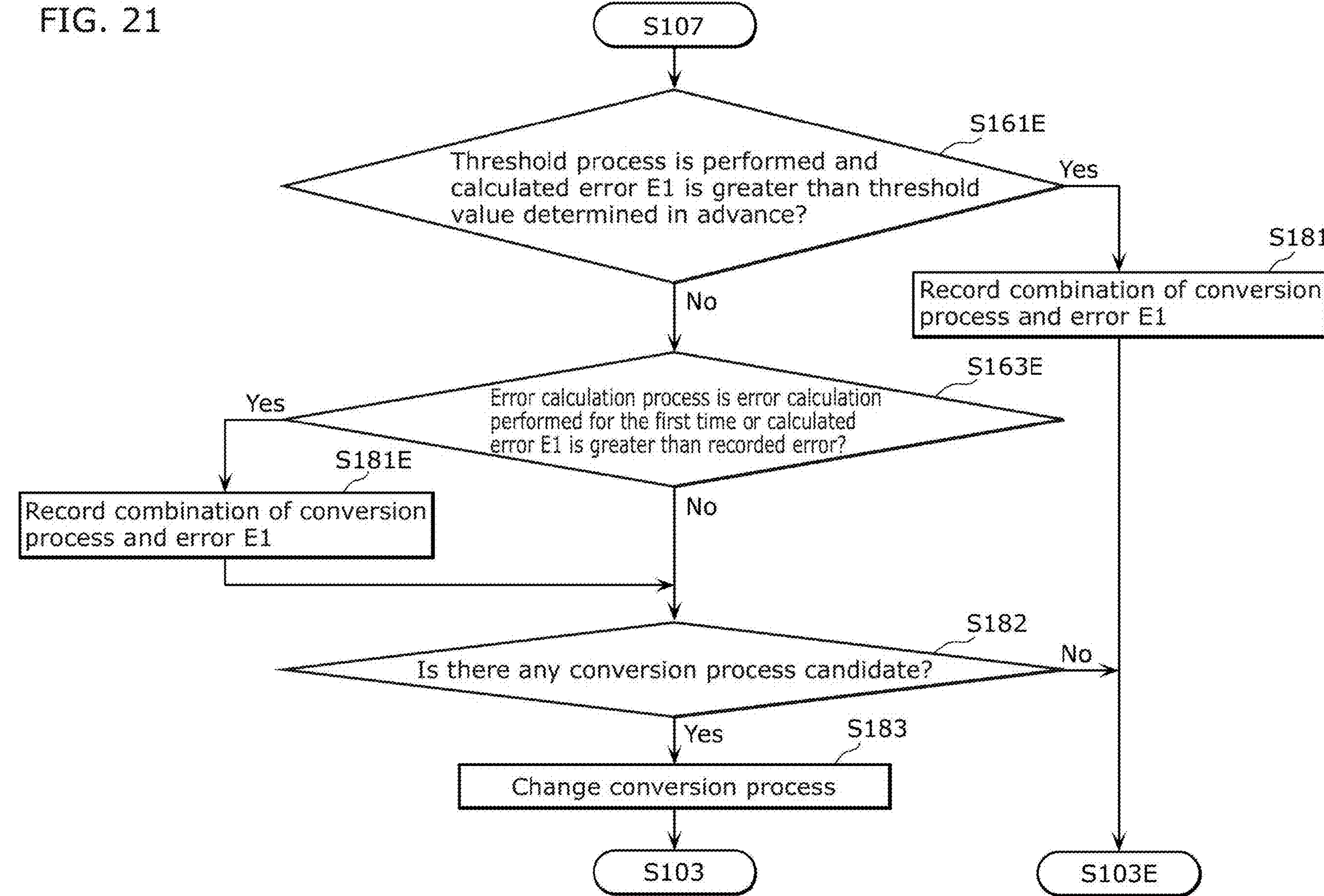
FIG. 21 is a flowchart illustrating a process of changing a conversion process in the processing executed by the information processing system according to Embodiment 5.

FIG. 20 and FIG. 21 are each a flowchart illustrating processing (also referred to as an information processing method) executed by information processing system 10E according to Embodiment 5. FIG. 20 is a flowchart illustrating processes resulting from excluding the conversion process changing process from the processes executed by information processing system 10E according to Embodiment 5. FIG. 21 is a flowchart illustrating the conversion process changing process among the processes executed by information processing system 10E according to Embodiment 5. The processes included in steps S101 through S109 in FIG. 20 are the same processes as those performed in information processing system 10A according to Embodiment 1 (see FIG. 3).

In step S161E, second selector 52E firstly determines whether to perform a threshold process to be described later. When determining not to perform the threshold process, second selector 52E performs a process in step S163E to be described later. When determining to perform the threshold process, second selector 52E determines whether error E1 calculated by error calculator 15E in step S107 is greater than a threshold value determined in advance. When error E1 is greater than the threshold value, second selector 52E performs a process in step S181 to be described later. When error E1 is less than the threshold value, second selector 52E performs the process in step S163E.

In step S181, second selector 52E records the combination of the conversion process executed by output converter 13E and error E1.

In step S163E, second selector 52E determines whether the error calculation process performed by error calculator 15E in step S107 is error calculation performed for the first time or whether error E1 calculated by error calculator 15E in step S107 is greater than a recorded error. In other words, second selector 52E refers to one or more combinations recorded by second selector 52E and when the combination of the conversion process performed by output converter 13E and error E1 is not in the record, determines that the error calculation process is error calculation process performed for the first time and performs a process in step S181E to be described later. When the combination is in the record and error E1 is greater than an error in a recorded combination matching the combination, second selector 52E performs the process in step S181E. When error E1 is less than the error in the recorded combination, second selector 52E performs a process in step S182 to be described later.

In step S181E, second selector 52E records the combination of the conversion process performed by output converter 13E and error E1.

In step S182, second selector 52E refers to a history of comparisons made between combinations, and determines whether there is any conversion process candidate that has not yet been compared. When such a conversion process candidate is present, second selector 52E performs a process in step S183 to be described later. When there is no such conversion process candidate, second selector 52E performs a process in step S103E to be described later.

In step S183, second selector 52E changes the conversion process to be executed by output converter 13E.

In step S103E, output converter 13E performs, on the first feature information obtained by first inference unit 11A in step S101, the conversion process in the combination recorded by second selector 52E in step S181 or step S181E, and obtains a first conversion result.

In step S104E, output converter 13E performs, on the second feature information obtained by second inference unit 12A in step S102, the conversion process in the combination recorded by second selector 52E in step S181 or step S181E, and obtains a second conversion result.

In step S105E, space projector 14A performs a projection process on the first conversion result obtained by output converter 13E in step S103E, and obtains a first projection result.

In step S106E, space projector 14A performs the projection process on the second conversion result obtained by output converter 13E in step S104E, and obtains a second projection result.

In step S107E, error calculator 15E calculates error E1 between the first projection result obtained by space projector 14A in step S105E and the second projection result obtained by space projector 14A in step S106E.

In step S102E, second inference unit 12A inputs input data to the inference model that uses network B, and obtains second feature information via network B.

In step S184, training controller 17E determines whether second selector 52E is to change again the conversion process every time trainer 16A updates coefficients in network B. When second selector 52E changes again the conversion process based on updated network B, information processing system 10E returns to step S103. When second selector 52E does not change again the conversion process, the process returns to step S103E and repeats the same sequence of processes as described above, Through the sequence of the processes described above, information processing system 10E changes a conversion process so that error E1 between a first projection result and a second projection result increases, and then trains an inference model that uses network B to reduce error E1 between the first projection result and the second projection result. As a result, it is possible to conduct training by machine learning more smoothly than the case of not changing the conversion process. Stated differently, it is possible to inhibit the training from being retarded.

As described above, the information processing method according to Embodiment 5 changes a conversion process so that the error between a first projection result and a second projection result (a first error) increases. Accordingly, it is possible to conduct training by machine learning more smoothly than the case of not changing the conversion process. Stated differently, it is possible to inhibit the training from being retarded.

The configuration according to Embodiment 5 may be applied to Embodiment 2 or Embodiment 3.

Embodiment 6

Embodiment 6 describes an information processing method and an information processing system that are different from the information processing method and the information processing system according to each of Embodiments 1 through 5, and that reduce, irrespective of the combination of input data, an inference result difference that may be generated when obtaining a new inference model using an inference model as an exemplar.

Hereinafter, an information processing system according to Embodiment 6 configured by modifying part of information processing system 10A according to Embodiment 1 will be described.

FIG. 22 is a block diagram illustrating the functional configuration of information processing system 10F according to Embodiment 6. Information processing system 10F is a system for obtaining a new inference model trained to output the same inference result as that obtained using an existing inference model.

As illustrated in FIG. 22, information processing system 10F includes first inference unit 11A, second inference unit 12A, output converter 13F, space projector 14F, error calculator 15F, trainer 16A, training controller 17F, and third selector 53F.

Among the elements included in information processing system 10F, first inference unit 11A, second inference unit 12A, and trainer 16A are the same as those included in information processing system 10A according to Embodiment 1. The following therefore describes output converter 13F, space projector 14F, error calculator 15F, training controller 17F, and third selector 53F in detail.

Output converter 13F has also the following functions in addition to functions that are same as those of output converter 13A according to Embodiment 1. In other words, output converter 13F obtains a conversion process resulting from recording or changing performed by third selector 53F. Output converter 13F then converts feature information obtained from first inference unit 11A and feature information obtained from second inference unit 12A, using the conversion process obtained from third selector 53F, and outputs conversion results regarding the feature information input. Output converter 13F also notifies third selector 53F of the conversion process executed by output converter 13F. The details of the conversion process recording and changing performed by third selector 53F will be described later.

Space projector 14F has also the following functions in addition to functions that are same as those of space projector 14A according to Embodiment 1. In other words, space projector 14F obtains a projection process resulting from recording or changing performed by third selector 53F. Space projector 14F then projects conversion results obtained from output converter 13F, using the projection process obtained from third selector 53F, and outputs projection results regarding the conversion results that have been input. Space projector 14F also notifies third selector 53F of the projection process executed by space projector 14F. The details of the projection process recording and changing performed by third selector 53F will be described later.

Error calculator 15F has also the following function in addition to functions that are same as those of error calculator 15A according to Embodiment 1. In other words, error calculator 15F outputs, to third selector 53F, error information calculated based on projection results obtained from space projector 14F (also referred to as a first error).

Third selector 53F changes a conversion process to be executed by output converter 13F and a projection process to be executed by space projector 14F so that a value indicated by error information to be calculated by error calculator 15F increases. Specifically, third selector 53F records a combination of an executed conversion process, an executed projection process, and calculated error information, and changes the conversion process and the projection process based on one or more recorded combinations. Third selector 53F records a combination of a conversion process to be executed by output converter 13F, a projection process to be executed by space projector 14F, and error information to be calculated by error calculator 15F based on the result of comparing (i) the combination of the conversion process executed by output converter 13F, the projection process executed by space projector 14F, and the error information calculated by error calculator 15F, and (ii) each of one or more combinations each being made up of a conversion process, a projection process, and error information which are placed in the record by third selector 53F.

Specifically, first, third selector 53F obtains a conversion process executed by output converter 13F, a projection process executed by space projector 14F, and a first error calculated by error calculator 15F. Third selector 53F refers to one or more combinations each being made up of a conversion process, a projection process, and error information recorded by third selector 53F. When the combination of the obtained conversion process, the obtained projection process, and the obtained first error is not present among the one or more recorded combinations, that is, when the combination of the obtained conversion process, the obtained projection process, and the obtained first error is a combination of a conversion process, a projection process, and error information obtained for the first time by third selector 53F, third selector 53F records the conversion process, the projection process, and the first error. When the combination of the obtained conversion process, the obtained projection process, and the obtained first error is present among the one or more recorded combinations, third selector 53F compares the first error with error information in a recorded combination matching the combination. When the first error is greater than the error information in the recorded combination, third selector 53F records the conversion process, the projection process, and the first error. When the first error is less than the error information in the recorded combination, third selector 53F does not perform the recording process and keeps the conversion process, the projection process, and the error information in the recorded combination.

Third selector 53F refers to a history of comparisons made between combinations. When there is a candidate for the combination of a conversion process and a projection process which has not yet been compared, third selector 53F changes a conversion process to be executed by output converter 13F and a projection process to be executed by space projector 14F. When there is no such candidate, third selector 53F changes the conversion process to be executed by output converter 13F and the projection process to be executed by space projector 14F to a conversion process and a projection process which are placed in the record by third selector 53F, respectively, and ends the changing and recording processes of the combination of a conversion process and a projection process. The conversion process is the same as that described in Embodiment 5 and the projection process is the same as that described in Embodiment 4.

The recording and changing processes of the combination of a conversion process and a projection process, which are performed by third selector 53F, may be ended based on a threshold value that is preset. In that case, third selector 53F compares the first error and the threshold value. When the first error is greater than the threshold value, third selector 53F records the combination of the conversion process, the projection process, and the first error, changes the conversion process to be executed by output converter 13F to the conversion process recorded by third selector 53F, changes the projection process to be executed by space projector 14F to the projection process recorded by third selector 53F, and ends the recording and changing processes of the combination of a conversion process and a projection process. When the first error is less than the threshold value, third selector 53F refers to one or more combinations each being made up of a conversion process, a projection process, and error information recorded by third selector 53F, and repeats the subsequent processes in the same manner, to change the conversion process and the projection process.

The recording and changing processes of the combination of a conversion process and a projection process, which are performed by third selector 53F, may be performed again based on network B updated by trainer 16A. In that case, third selector 53F receives an instruction from training controller 17F and executes the processes described above in the same manner, to change the conversion process and the projection process.

In the process of changing the combination of a conversion process and a projection process, which is performed by third selector 53F, the process of changing the conversion process and the process of changing the projection process may be performed in order or at the same time. In other words, in the case where the process of changing the conversion process and the process of changing the projection process are performed in order by third selector 53F, (i) the conversion process is changed so that the first error increases, and then based on the changed conversion process, the projection process is changed so that the first error increases, or (ii) the projection process is changed so that the first error increases, and then based on the changed projection process, the conversion process is changed so that the first error increases. In the case where the process of changing the conversion process and the process of changing the projection process are performed at the same time by third selector 53F, the combination of a conversion process and a projection process is changed so that the first error increases. A well-known technique such as Bayesian optimization may be employed for the changing method in this case.

Training controller 17F has also the following function in addition to functions that are same as those of training controller 17A according to Embodiment 1. In other words, based on network B updated by trainer 16A, training controller 17F causes third selector 53F to perform again the process of changing the combination of a conversion process and a projection process. For example, training controller 17F causes each of first inference unit 11A and second inference unit 12A to input new input data and causes first inference unit 11A, second inference unit 12A, output converter 13F, space projector 14F, error calculator 15F, third selector 53F, and trainer 16A to execute again the above processes, to further train an inference model that uses network B.

FIG. 23 is a diagram illustrating a process of changing the combination of a conversion process and a projection process in information processing system 10F according to Embodiment 6.

A process from when input data is input by first inference unit 11A until when an error is calculated by error calculator 15F is the same as that included in the training performed in information processing system 10A according to Embodiment 1.

After the error is calculated by error calculator 15F, third selector 53F changes a conversion process to be executed by output converter 13F and a projection process to be executed by space projector 14F, so that an error to be calculated by error calculator 15F increases. The details of the changing of the conversion process are the same as those described in Embodiment 5. The details of the changing of the projection process are the same as those described in Embodiment 4.

FIG. 24 is a diagram illustrating training conducted by second inference unit 12A in information processing system 10F according to Embodiment 6.

A process from when input data is input by inference unit 11A until when network B is updated by trainer 16A is the same as that included in the training performed in information processing system 10A according to Embodiment 1.

A conversion process to be executed by output converter 13F is a process resulting from the conversion process changing process performed by third selector 53F. The details of a process performed by output converter 13F when third selector 53F changes the conversion process is the same as that performed in information processing system 10E according to Embodiment 5.

A projection process to be executed by space projector 14F is a process resulting from the projection process changing process performed by third selector 53F. The details of a process performed by space projector 14F when third selector 53F changes the projection process is the same as that performed in information processing system 10D according to Embodiment 4.

The subsequent processes after projection results are input to error calculator 15F are the same as those included in the training performed in information processing system 10A according to Embodiment 1.

The following describes processing executed by information processing system 10F configured as described above.

FIG. 25 and FIG. 26 are each a flowchart illustrating processing (also referred to as an information processing method) executed by information processing system 10F according to Embodiment 6. FIG. 25 is a flowchart illustrating processes resulting from excluding the process of changing the combination of a conversion process and a projection process from processes executed by information processing system 10F according to Embodiment 6. FIG. 26 is a flowchart illustrating the process of changing the combination of a conversion process and a projection process among the processes executed by information processing system 10F according to Embodiment 6.

The processes included in steps S101 through S109 in FIG. 25 are the same processes as those performed in information processing system 10A according to Embodiment 1 (see FIG. 3).

In step S161F, third selector 53F firstly determines whether to perform a threshold process to be described later. When determining not to perform the threshold process, third selector 53F performs a process in step S163F to be described later. When determining to perform the threshold process, third selector 53F determines whether error E1 calculated by error calculator 15F in step S107 is greater than a threshold value determined in advance. When error E1 is greater than the threshold value, third selector 53F performs a process in step S191 to be described later. When error E1 is less than the threshold value, third selector 53F performs the process in step S163F.

In step S191, third selector 53F records the combination of the conversion process executed by output converter 13F, the projection process executed by space projector 14F, and error E1.

In step S163F, third selector 53F determines whether the error calculation process performed by error calculator 15F in step S107 is error calculation performed for the first time or whether error E1 calculated by error calculator 15F in step S107 is greater than a recorded error. In other words, third selector 53F refers to one or more combinations recorded by third selector 53F and when the combination of the conversion process executed by output converter 13F, the projection process executed by space projector 14F, and error E1 is not in the record, determines that the error calculation process is error calculation performed for the first time and performs a process in step S191F to be described later. When the combination is in the record and error E1 is greater than an error in a recorded combination matching the combination, third selector 53F performs the process in step S191F. When error E1 is less than the error in the recorded combination, third selector 53F performs a process in step S192 to be described later.

In step S191F, third selector 53F records the combination of the conversion process executed by output converter 13F, the projection process executed by space projector 14F, and error E1.

In step S192, third selector 53F refers to a history of comparisons made between combinations, and determines whether there is any candidate for the combination of a conversion process and a projection process which has not yet been compared. When there is such a candidate, third selector 53F performs a process in step S193 to be described later. When there is no such candidate, third selector 53F performs a process in step S103F to be described later.

In step S193, third selector 53F changes the conversion process to be executed by output converter 13F and the projection process to be executed by space projector 14F.

In step S103F, output converter 13F performs, on the first feature information obtained by first inference unit 11A in step S101, the conversion process in the combination recorded by third selector 53F in step S191 or step S191F, and obtains a first conversion result.

In step S104F, output converter 13F performs, on the second feature information obtained by second inference unit 12A in step S102, the conversion process in the combination recorded by third selector 53F in step S191 or step S191F, and obtains a second conversion result.

In step S105F, space projector 14F performs, on the first conversion result obtained by output converter 13F in step S103F, the projection process in the combination recorded by third selector 53F in step S191 or step S191F, and obtains a first projection result.

In step S106F, space projector 14F performs, on the second conversion result obtained by output converter 13F in step S104F, the projection process in the combination recorded by third selector 53F in step S191 or step S191F, and obtains a second projection result.

In step S107F, error calculator 15F calculates error E1 between the first projection result obtained by space projector 14F in step S105F and the second projection result obtained by space projector 14F in step S106F.

In step S102F, second inference unit 12A inputs input data to the inference model that uses network B, and obtains second feature information via network B.

In step S194, training controller 17F determines whether third selector 53F is to change again the combination of a conversion process and a projection process every time trainer 16A updates coefficients in network B. When third selector 53F changes again the combination of a conversion process and a projection process based on updated network B, information processing system 10F returns to step S103.

When third selector 53F does not change again the combination of a conversion process and a projection process, information processing system 10F returns to step S103F and repeats the same sequence of processes as described above.

Through the sequence of the processes described above, information processing system 10F changes the combination of a conversion process and a projection process so that error E1 between a first projection result and a second projection result increases, and then trains an inference model that uses network B to reduce error E1 between the first projection result and the second projection result. As a result, it is possible to conduct training by machine learning more smoothly than the case of not changing at least one of the conversion process or the projection process. Stated differently, it is possible to inhibit the training from being retarded.

As described above, the information processing method according to Embodiment 6 changes the combination of a conversion process and a projection process so that the error between a first projection result and a second projection result (a first error) increases. Accordingly, it is possible to conduct training by machine learning more smoothly than the case of not changing at least one of the conversion process or the projection process. Stated differently, it is possible to inhibit the training from being retarded.

The configuration according to the present embodiment may be applied to Embodiment 2 or Embodiment 3.

Variation

A process of determining whether a conversion process is necessary or not may be performed in the processing executed by each of information processing system 10A through 10F according to Embodiments 1 through 6. The following describes a variation of the case of determining whether a conversion process is necessary. Although the following describes, as an example, a process executed by information processing system 10A according to Embodiment 1, the same process is performed also in the case where any one of information processing systems 10B through 10F according to Embodiment 2 through 6 performs the process.

FIG. 27 is a flowchart illustrating processing executed by an information processing system according to a variation.

The processes included in steps S101 through S109 in FIG. 27 are the same processes as those performed in information processing system 10A according to Embodiment 1 (see FIG. 3).

In step S110, error calculator 15A determines whether or not to perform determination of whether a conversion process is necessary. When the determination is not performed, the process in step S108 is performed. When the determination is performed, a process in step S111 to be described later is performed.

In step S111, space projector 14A performs a projection process on the first feature information obtained by first inference unit 11A via network A in step S101, and obtains a first non-conversion projection result.

In step S112, space projector 14A performs the projection process on the second feature information obtained by second inference unit 12A via network B in step S102, and obtains a second non-conversion projection result.

In step S113, error calculator 15A calculates error E0 between the first non-conversion projection result obtained by space projector 14A in step S111 and the second non-conversion projection result obtained by space projector 14A in step S112.

In step S114, error calculator 15A determines whether error E1 calculated by error calculator 15A in step S107 is greater than error E0 calculated by error calculator 15A in step S113. When error E1 is greater than error E0, error calculator 15A determines that a conversion process is necessary and the process in step S108 is performed. When error E1 is less than error E0, error calculator 15A determines that a conversion process is unnecessary, and a process in step S108A to be described later is performed.

In the process in step S114, when error E0 is greater than a predetermined threshold value, error calculator 15A may determine that a conversion process is necessary, and when error E0 is less than the predetermined threshold value, error calculator 15A may determine that a conversion process is unnecessary.

In step S108A, trainer 16A updates coefficients in network B using error E0 calculated in step S113 to reduce error E0, and performs the process in step S109.

(Supplementary Information)

Each of the functions included in each of information processing system 10A through information processing system 10F can be realized by a predetermined program being executed by a processor (e.g., a CPU) (not shown in the drawings).

Each of the elements in each of Embodiments 1 through 6 and the variation may be configured in the form of an exclusive hardware product, or may be realized by executing a software program suitable for the element. Each of the elements may be realized by a program executing unit such as a CPU or a processor reading and executing the software program recorded on a recording medium such as a hard disk or a semiconductor memory. Here, the software program for realizing the information processing device according to each of the embodiments and the variation, for instance, is a program described below.

The program causes a computer to execute an information processing method that is executed by a processor and includes: inputting first data to a first inference model to obtain first feature information; inputting the first data to a second inference model to obtain second feature information; performing a conversion process on the first feature information to obtain a first conversion result; performing the conversion process on the second feature information to obtain a second conversion result; performing a projection process on the first conversion result to obtain a first projection result; performing the projection process on the second conversion result to obtain a second projection result; obtaining a first error indicating an error between the first projection result and the second projection result; and training the second inference model by machine learning to reduce the first error. The conversion process produces an error between the first projection result and the second projection result that is greater than an error between a first non-conversion projection result and a second non-conversion projection result, where the first non-conversion projection result is obtained by performing the projection process on the first feature information, and the second non-conversion projection result is obtained by performing the projection process on the second feature information.

The program causes a computer to execute an information processing method that is executed by a processor and includes: inputting first data to a first inference model to obtain first feature information; inputting the first data to a second inference model to obtain second feature information; performing a conversion process on the first feature information to obtain a first conversion result; performing the conversion process on the second feature information to obtain a second conversion result; performing a projection process on the first conversion result to obtain a first projection result; performing the projection process on the second conversion result to obtain a second projection result; obtaining a first error indicating an error between the first projection result and the second projection result; training a third inference model by machine learning to reduce the first error; and performing a model conversion process of converting the trained third inference model, to update the second inference model. The conversion process produces an error between the first projection result and the second projection result that is greater than an error between a first non-conversion projection result and a second non-conversion projection result, where the first non-conversion projection result is obtained by performing the projection process on the first feature information, and the second non-conversion projection result is obtained by performing the projection process on the second feature information.

These programs are recorded on, for example, a computer-readable non-transitory recording medium.

As described above, examples of techniques disclosed in the present application have been described based on embodiments and a variation. The present disclosure, however, is not limited to these embodiments and variation. Various modifications to the embodiments and variation which may be conceived by those skilled in the art, as well as embodiments resulting from combinations of elements from different embodiments and variation are included within the scope of the present disclosure so long as they do not depart from the essence of the present disclosure.

INDUSTRIAL APPLICABILITY

The present disclosure is applicable to a system that generates a new inference model using an existing inference model as an exemplar.

The invention claimed is:

1. An information processing method for reducing an inference result difference between a first inference model and a second inference model, the information processing method executed by a processor, the information processing method comprising:

inputting first data to the first inference model to obtain first feature information;

inputting the first data to the second inference model to obtain second feature information;

performing a conversion process on the first feature information to obtain a first conversion result;

performing the conversion process on the second feature information to obtain a second conversion result;

performing a projection process on the first conversion result to obtain a first projection result;

performing the projection process on the second conversion result to obtain a second projection result;

obtaining a first error indicating an error between the first projection result and the second projection result; and training the second inference model by machine learning to reduce the first error, wherein the conversion process produces an error between the first projection result and the second projection result that is greater than an error between a first non-conversion projection result and a second non-conversion projection result, the first non-conversion projection result being obtained by performing the projection process on the first feature information, the second non-conversion projection result being obtained by performing the projection process on the second feature information, wherein the inference result difference between the first inference model and the second inference model is reduced by the information processing method.

2. The information processing method according to claim 1, wherein in the training of the second inference model, the second inference model is trained by machine learning using also a second error indicating a difference between a first inference result and a second inference result, the first inference result being additionally obtained by inputting the first data to the first inference model, the second inference result being additionally obtained by inputting the first data to the second inference model.

3. The information processing method according to claim 1, further comprising:

changing the projection process to increase the first error.

4. The information processing method according to claim 1, further comprising:

changing the conversion process to increase the first error.

5. The information processing method according to claim 1, further comprising:

changing a combination of the conversion process and the projection process to increase the first error.

6. The information processing method according to claim 1, wherein the conversion process includes a process of performing scale conversion on an input.

7. The information processing method according to claim 1, wherein the projection process includes a process of projecting input to an inner product space.

8. The information processing method according to claim 1, wherein the projection process includes a process of reducing a total number of dimensions of input.

9. The information processing method according to claim 8, wherein the process of reducing the total number of dimensions includes principal component analysis.

10. The information processing method according to claim 1, wherein the first data is image data.

11. An information processing method for reducing an inference result difference between a first inference model and a second inference model, the information processing method executed by a processor, the information processing method comprising:

inputting first data to the first inference model to obtain first feature information;

inputting the first data to the second inference model to obtain second feature information;

performing a conversion process on the first feature information to obtain a first conversion result;

performing the conversion process on the second feature information to obtain a second conversion result;

performing a projection process on the first conversion result to obtain a first projection result;

performing the projection process on the second conversion result to obtain a second projection result;

obtaining a first error indicating an error between the first projection result and the second projection result;

training a third inference model by machine learning to reduce the first error; and performing a model conversion process of converting the trained third inference model, to update the second inference model, wherein the conversion process produces an error between the first projection result and the second projection result that is greater than an error between a first non-conversion projection result and a second non-conversion projection result, the first non-conversion projection result being obtained by performing the projection process on the first feature information, the second non-conversion projection result being obtained by performing the projection process on the second feature information, wherein the inference result difference between the first inference model and the second inference model is reduced by the information processing method.

12. The information processing method according to claim 11, wherein in the training of the third inference model, the third inference model is trained by machine learning using also a second error indicating a difference between a first inference result and a second inference result, the first inference result being additionally obtained by inputting the first data to the first inference model, the second inference result being additionally obtained by inputting the first data to the second inference model.

13. The information processing method according to claim 11, further comprising:

changing the projection process to increase the first error.

14. The information processing method according to claim 11, further comprising:

changing the conversion process to increase the first error.

15. The information processing method according to claim 11, further comprising:

changing a combination of the conversion process and the projection process to increase the first error.

16. The information processing method according to claim 11, wherein the first inference model, the second inference model, and the third inference model are each a neural network model, and the model conversion process includes a process of compressing the neural network model.

17. The information processing method according to claim 16, wherein the process of compressing the neural network model includes a process of quantizing the neural network model.

18. The information processing method according to claim 17, wherein the process of quantizing the neural network model includes a process of converting a coefficient in the neural network model from a floating-point format to a fixed-point format.

19. The information processing method according to claim 16, wherein the process of compressing the neural network model includes a process of reducing a total number of nodes in the neural network model or a process of removing a connection between nodes in the neural network model.

20. The information processing method according to claim 11, wherein the conversion process includes a process of performing scale conversion on an input.

21. The information processing method according to claim 11, wherein the projection process includes a process of projecting input to an inner product space.

22. The information processing method according to claim 11, wherein the projection process includes a process of reducing a total number of dimensions of input.

23. The information processing method according to claim 22, wherein the process of reducing the total number of dimensions includes principal component analysis.

24. The information processing method according to claim 11, wherein the first data is image data.

25. An information processing system for reducing an inference result difference between a first inference model and a second inference model, the information processing system comprising:

a processor; and memory on which a program is recorded, wherein when the program is executed by the processor, the program causes the processor to:

obtain second data; and input the second data obtained to the second inference model, and obtain and output a second inference result, wherein the second inference model is a model obtained by executing an information processing method, the information processing method being executed by the processor and including:

inputting first data to the first inference model to obtain first feature information;

inputting the first data to a second inference model to obtain second feature information;

performing a conversion process on the first feature information to obtain a first conversion result;

performing the conversion process on the second feature information to obtain a second conversion result;

performing a projection process on the first conversion result to obtain a first projection result;

performing the projection process on the second conversion result to obtain a second projection result;

obtaining a first error indicating an error between the first projection result and the second projection result; and training the second inference model by machine learning to reduce the first error, and the conversion process produces an error between the first projection result and the second projection result that is greater than an error between a first non-conversion projection result and a second non-conversion projection result, the first non-conversion projection result being obtained by performing the projection process on the first feature information, the second non-conversion projection result being obtained by performing the projection process on the second feature information, wherein the inference result difference between the first inference model and the second inference model is reduced by the information processing system.

26. An information processing system for reducing an inference result difference between a first inference model and a second inference model, the information processing system comprising:

a processor; and memory on which a program is recorded, wherein when the program is executed by the processor, the program causes the processor to:

obtain second data; and input the second data obtained to the second inference model, and obtain and output a second inference result, wherein the second inference model is a model obtained by executing an information processing method, the information processing method being executed by the processor and including:

inputting first data to the first inference model to obtain first feature information;

inputting the first data to a second inference model to obtain second feature information;

performing a conversion process on the first feature information to obtain a first conversion result;

performing the conversion process on the second feature information to obtain a second conversion result;

performing a projection process on the first conversion result to obtain a first projection result;

performing the projection process on the second conversion result to obtain a second projection result;

obtaining a first error indicating an error between the first projection result and the second projection result;

training a third inference model by machine learning to reduce the first error; and performing a model conversion process of converting the trained third inference model, to update the second inference model, and the conversion process produces an error between the first projection result and the second projection result that is greater than an error between a first non-conversion projection result and a second non-conversion projection result, the first non-conversion projection result being obtained by performing the projection process on the first feature information, the second non-conversion projection result being obtained by performing the projection process on the second feature information, wherein the inference result difference between the first inference model and the second inference model is reduced by the information processing system.

* * * * *